US008184346B2

(12) United States Patent
Ozawa et al.

(10) Patent No.: US 8,184,346 B2
(45) Date of Patent: May 22, 2012

(54) STATUS SENDING FACSIMILE TRANSMISSION SYSTEM, STATUS SENDING FACSIMILE RECEIVING DEVICE, AND STATUS SENDING FACSIMILE RECEIVING METHOD

(75) Inventors: Takao Ozawa, Shiojiri (JP); Kosuke Matsunaga, Oita (JP); Teruhito Kojima, Shiojiri (JP); Toshifumi Sakai, Shioziri (JP); Katsunori Nagao, Matsumoto (JP); Kiyoshi Yoda, Matsumoto (JP); Masanobu Nishitani, Suwa (JP); Eiji Kubota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1203 days.

(21) Appl. No.: 11/906,735

(22) Filed: Oct. 2, 2007

(65) Prior Publication Data
US 2008/0117475 A1    May 22, 2008

(30) Foreign Application Priority Data

Oct. 2, 2006   (JP) .................................. 2006-270821
Sep. 27, 2007  (JP) .................................. 2007-251408

(51) Int. Cl.
*H04N 1/32* (2006.01)
(52) U.S. Cl. ....... 358/468; 358/1.15; 358/401; 358/405; 358/406; 358/426.09; 358/435; 358/436; 358/440; 358/442; 714/1; 714/37; 709/224; 709/228
(58) Field of Classification Search .................. 358/407, 358/435, 440, 1.15, 401, 405, 406, 426.09, 358/436, 468, 442; 714/1, 37; 709/224, 709/228
See application file for complete search history.

(56) References Cited

U.S. PATENT DOCUMENTS

| 5,442,457 | A  | * | 8/1995  | Najafi ........................... 358/400 |
|-----------|----|----|---------|-------------------------------------------|
| 5,682,460 | A  | * | 10/1997 | Hyziak et al. .................. 709/217  |
| 6,545,768 | B1 | * | 4/2003  | Matsubara et al. ........... 358/1.15     |
| 6,625,646 | B1 | * | 9/2003  | Kamanaka et al. ............ 709/224      |
| 6,889,264 | B2 | * | 5/2005  | Clough et al. ................... 710/15  |
| 6,993,681 | B2 | * | 1/2006  | Haynes et al. ................... 714/23  |
| 7,215,437 | B2 | * | 5/2007  | Shima ........................... 358/1.15 |
| 7,460,266 | B2 | * | 12/2008 | Shima ........................... 358/1.15 |
| 7,480,287 | B2 |   | 1/2009  | Tanimoto                                   |
| 7,480,714 | B2 | * | 1/2009  | Wakabayashi ................. 709/224     |
| 7,859,698 | B2 | * | 12/2010 | Ozawa et al. ................. 358/1.15   |
| 7,924,454 | B2 | * | 4/2011  | Boire-Lavigne et al. ..... 358/1.15       |
| 7,948,970 | B2 |   | 5/2011  | Tanimoto                                   |
| 2002/0093674 | A1 | * | 7/2002 | Ferlitsch et al. .............. 358/1.15  |
| 2002/0101621 | A1 | * | 8/2002 | Terao ............................ 358/405 |
| 2003/0107776 | A1 | * | 6/2003 | Maeda .......................... 358/402   |
| 2003/0160998 | A1 | * | 8/2003 | Kuwahara ..................... 358/1.15   |

(Continued)

FOREIGN PATENT DOCUMENTS
JP      06-152807      5/1994
(Continued)

*Primary Examiner* — Twyler Haskins
*Assistant Examiner* — Dennis Dicker
(74) *Attorney, Agent, or Firm* — Nutter McClennen & Fish LLP; John J. Penny, Jr.; Christina M. Sperry

(57) ABSTRACT

Facsimile systems, devices, and methods are provided related to transmitting an image from a sending device to a receiving device via a network. One embodiment includes a status information reply unit which replies to a notification request of status information from a sending device by transmitting status information representing status of the receiving-device to the sending device via a network, in which the status information reply unit includes a transmission source classifying portion which determines a class of the sending device and a selected-status information transmitting portion which transmits the status information to the sending device via the network.

12 Claims, 14 Drawing Sheets

U.S. PATENT DOCUMENTS

| | | | |
|---|---|---|---|
| 2004/0019912 A1* | 1/2004 | Staack | 725/109 |
| 2004/0085571 A1* | 5/2004 | Hulan et al. | 358/1.15 |
| 2005/0099651 A1* | 5/2005 | Kimura et al. | 358/1.15 |
| 2005/0190404 A1* | 9/2005 | Nakamura | 358/1.15 |
| 2008/0080015 A1* | 4/2008 | Mizumukai | 358/442 |

FOREIGN PATENT DOCUMENTS

| | | |
|---|---|---|
| JP | 10-155050 | 6/1998 |
| JP | 10-178511 | 6/1998 |
| JP | 10-301863 | 11/1998 |
| JP | 2000-138810 | 5/2000 |
| JP | 2003-309701 | 10/2003 |
| JP | 2004-112328 | 4/2004 |
| JP | 2004-147244 | 5/2004 |
| JP | 2004-172853 A | 6/2004 |
| JP | 2004-221945 A | 8/2004 |
| JP | 2005-157603 A | 6/2005 |
| JP | 2006-178783 A | 7/2006 |

* cited by examiner

FIG. 13
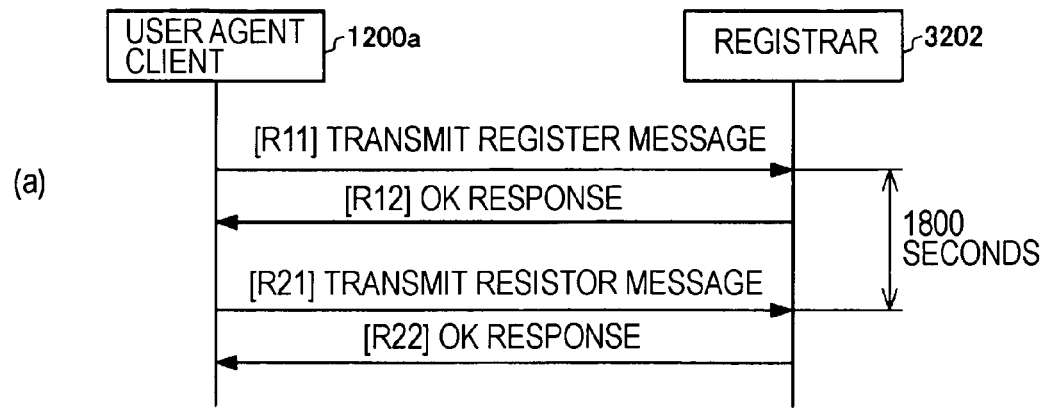
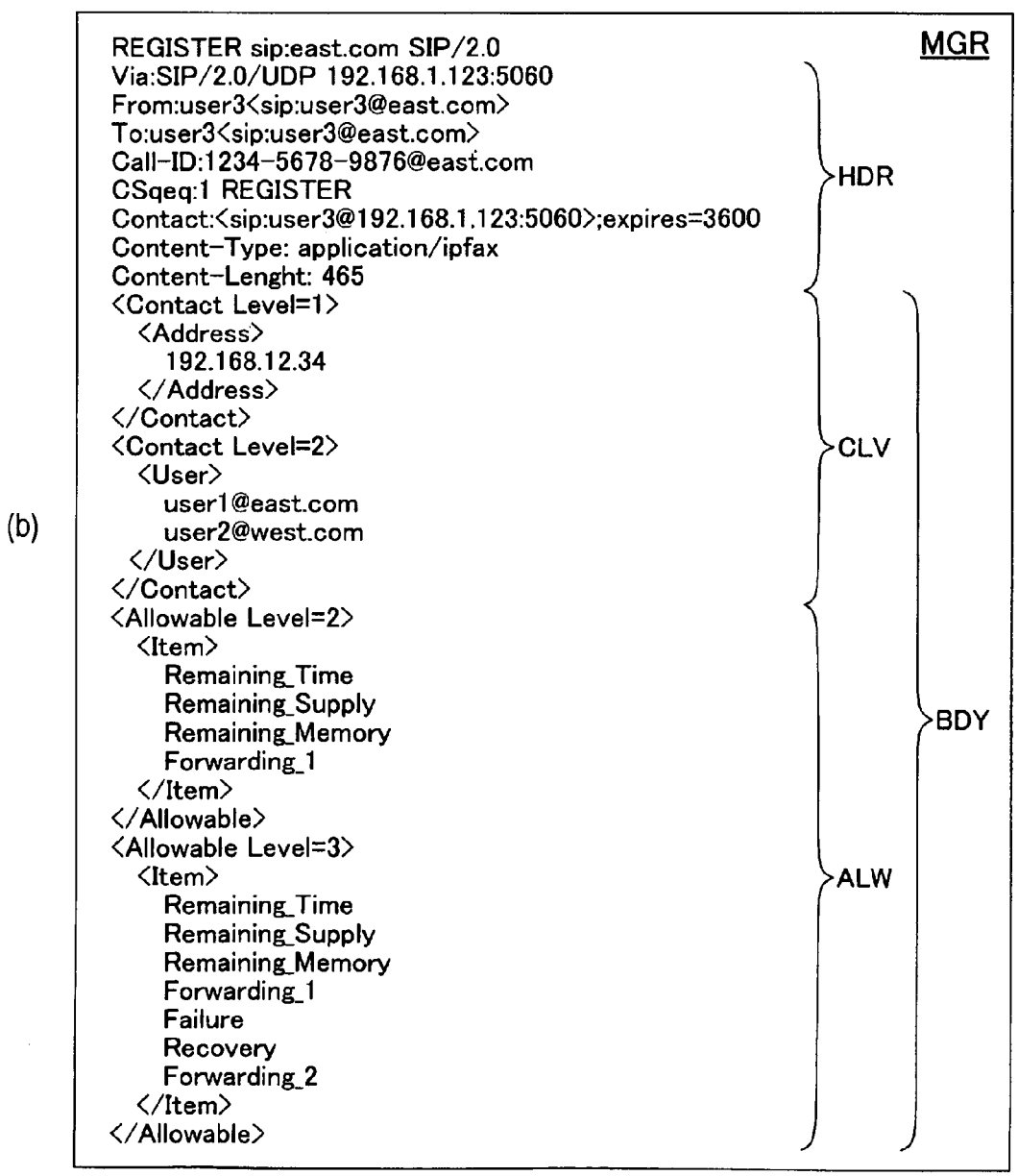

STATUS SENDING FACSIMILE
TRANSMISSION SYSTEM, STATUS SENDING
FACSIMILE RECEIVING DEVICE, AND
STATUS SENDING FACSIMILE RECEIVING
METHOD

The entire disclosure of Japanese Patent Application No. 2006-270821, filed Oct. 2, 2006 is expressly incorporated by reference herein.

BACKGROUND

1. Technical Field

The present invention relates to a technique of facsimile transmission of an image via a network.

2. Related Art

In facsimile transmission for transmitting an image from a sending device to a receiving device, an image acquired by a sending device is converted into audio signals and then transmitted to a receiving device over an audio communication line. In addition to a telephone network which has been used for long time, a telephone network (IP telephone network) using the Internet has come to be used as the audio communication line. Thus, suggested are facsimile transmission devices which transmit facsimile data via a network by performing audio signal transmission via the IP telephone network (see Patent document 1).

[Patent document 1] JP-A-2003-309701
[Patent document 2] JP-A-2004-147244

However, in case of facsimile transmission via a network, the facsimile transmission is performed based on the audio signal transmission via the IP telephone network. Accordingly, when performing the facsimile transmission, processing such as call control of a facsimile receiving device of a transmission destination is performed in the same manner as the verbal communication. Accordingly, convenience of facsimile transmission using the network is not satisfactory but is almost equal to that of the typical facsimile transmission even though it uses the network.

SUMMARY

The invention is made in view of the above-mentioned problems and thus the invention provides a technique of enhancing convenience of facsimile transmission via a network.

In order to accomplish at least some of the above objects, there is provided a facsimile transmission system transmitting an image from a sending device to a receiving device via a network including a status information reply unit which replies to a notification request of status information from the sending device by transmitting the status information representing status of the receiving-device to the sending device via the network, in which the status information reply unit includes a transmission source classifying portion which determines a class of the sending device by classifying sending devices into a plurality of classes on the basis of a message transmitted by the sending devices via the network upon the notification request, and a selected-status information transmitting portion which transmits the sending device via the network the status information selected according to the class of the sending-side device, which is classified by the transmission source classifying portion among a plurality of status information representing the status of the receiving device.

According to such a structure, the sending devices are classified into a plurality of classes. Further, status information selected according to the class of the sending device is transmitted to the sending device. Accordingly, some of sending devices can obtain detailed information of the status of the receiving device, and thus it becomes more convenient to perform facsimile transmission.

The facsimile transmission system may further include a communication establishing unit which intervenes in establishment of a communication path between the sending device and the receiving device.

According to such a structure, the status information reply unit is provided to the communication establishing portion which intervenes in establishment of communication path between the sending device and the receiving device. Accordingly, prior to the establishment of the communication path between the sending device and the receiving device, the sending device can acquire information in association with the status of the receiving device. Thus, the sending device can judge if the receiving device is in unsuitable state for facsimile transmission prior to the establishment of the communication path.

It is preferable that the communication establishing unit may preliminarily acquire from the receiving device identification information which is contained in a message and which can specify the sending device, transmission source classification information representing the correspondence relationship with the class of the sending device, and selected-information specification information for setting selected status information with respect to the class of the sending device.

According to the structure, the communication establishing unit preliminarily acquires the transmission source classification information and the selected information specification information from the receiving device. Accordingly, the communication establishing unit can select the status information, which is transmitted to the sending device, prior to the notification request for the status information, which is made by the sending device. Thus, since it is possible to omit the selection of the status information according to the circumstances of the notification request for the status information, which is made by the sending device, it is possible to much rapidly transmit the selected status information to the sending device.

In order to achieve at least some of the objects, there is provided a facsimile receiving device a facsimile receiving device receiving an image from a sending device connected thereto via a peer-to-peer communication path includes a status information reply unit which replies to a notification request of status information from the sending device by transmitting the status information representing status of the receiving-device to the sending device via a peer-to-peer communication path, in which the status information reply unit includes a transmission source classifying portion which determines a class of the sending device by classifying sending devices into a plurality of classes on the basis of a message transmitted by the sending device to the receiving device via the peer-to-peer communication path upon the notification request, and a class-based status information transmission portion which transmits the sending device via the peer-to-peer communication path class-based status information which is a kind of status information preliminarily set with respect to the class of the sending device, which is classified by the transmission source classifying portion.

According to the structure, the facsimile receiving device classifies sending devices into a plurality of classes, and changes the status information which is transmitted to the sending device according to the class of the sending device. Accordingly, the sending device can obtain detailed information about the status of the receiving device, and thus it is possible to enhance the convenience of the facsimile transmission.

It is preferable that the communication between the sending device and the receiving device via the peer-to-peer communication path is performed based on a predetermined protocol, and wherein each of a plurality of class-based status information preliminarily set with respect to the plurality of classes includes status information representing the status of the receiving device defined by the predetermined protocol.

According to the structure, the class-based status information transmitted from the receiving device to the sending device on the purpose of reply includes the status information defined by the protocol used for facsimile transmission. Accordingly, it is possible to transmit the status information to devices having the same protocol as a reply, and also to perform the facsimile transmission using a protocol used for purposes other than the facsimile transmission.

It is preferable that the status information reply portion transmits the status information to the sending device before classifying the sending devices by the transmission source classifying portion.

According to the structure, the transmitted status information is transmitted prior to the classification of the sending devices even before the classification of the sending devices is performed. The sending device can determine processing content according to the preliminarily transmitted status information, and it is possible to shorten time needed for the facsimile transmission.

It is preferable that the status information reply portion transmits additional status information to the sending device after transmission of the status information in the case in which the class-based status information transmitted to the sending device contains the additional status information in addition to the status information.

According to the structure, the sending device can acquire both the status information and the additional status information by transmitting the notification request of the status information one time. Accordingly, it is possible to decrease the number of transmissions of the request from the sending device to the receiving device.

The invention can be realized in various forms. For example, the invention can be realized in forms of a facsimile receiving device, a transmission device for transmitting an image to the facsimile receiving device, a control device and a control method for controlling the facsimile receiving device and the transmission device, a facsimile transmission system and a facsimile transmission method using such facsimile receiving device or the transmission device, computer programs realizing the receiving device, the transmission device, the control device, the control method, the transmission system, and the transmission method, a recording medium in which the computer programs are recorded, and a data signal which contains the computer programs but which is not carried.

BRIEF DESCRIPTION OF THE DRAWINGS

FIG. 13 is an explanatory view illustrating the flow of transmission of a register message from an IP-FAX terminal 100a to a registrar 3202.

DESCRIPTION OF EXEMPLARY EMBODIMENTS

Figure 1:
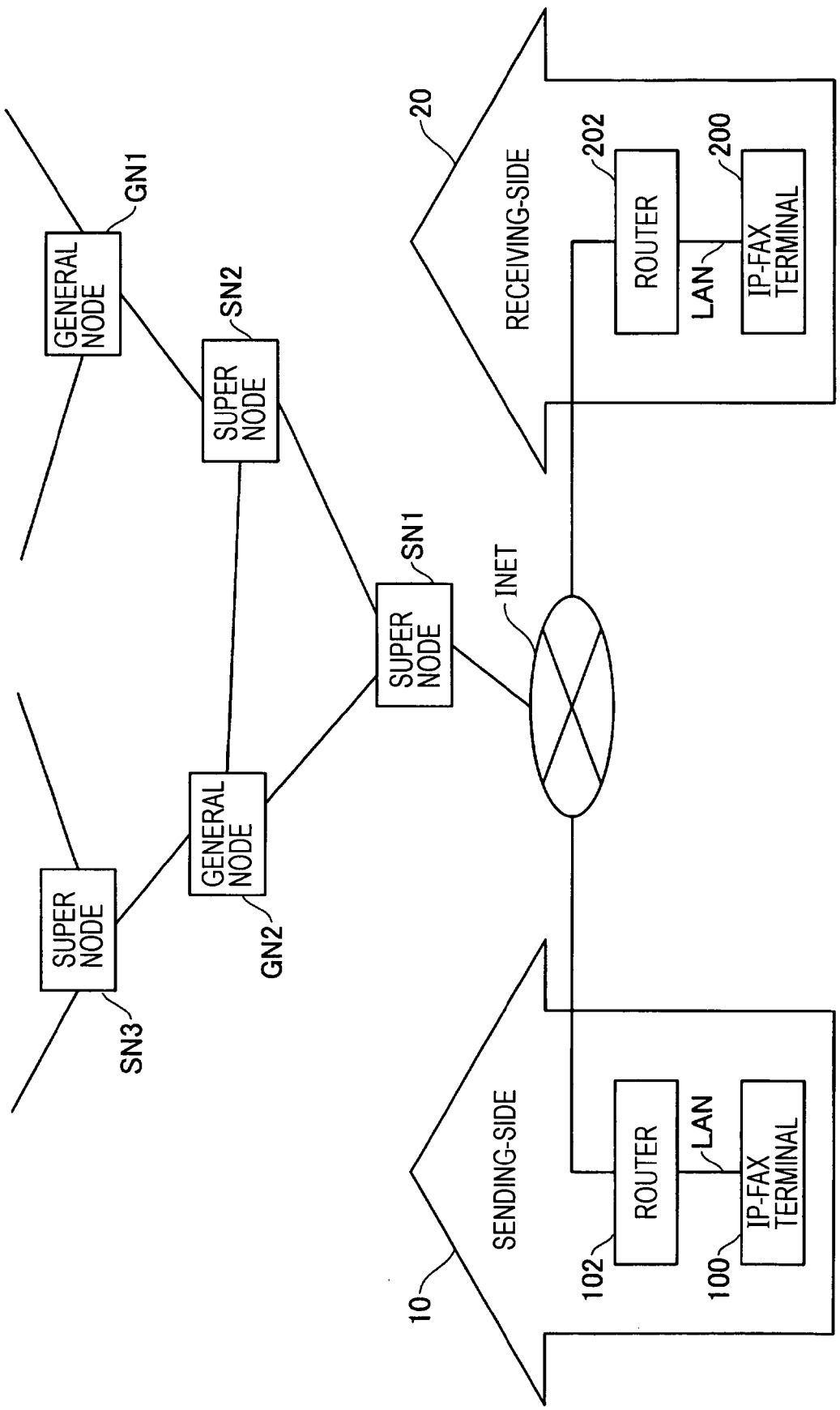
FIG. 1 is an explanatory view illustrating a structure of a facsimile transmission system according to a first embodiment.

Hereinafter, the invention in the form of one or more exemplary embodiments will be described.
A. First Embodiment
B. Second Embodiment
C. Variation
[Base 0016]
A. First Embodiment FIG. 1 is an explanatory view illustrating a structure of a facsimile transmission system according to a first embodiment of the invention. In this facsimile transmission system, a sending-side network system 10 and a receiving-side network system 20 are connected to each other via the Internet INET.

The sending-side network system 10 has a structure in which a networked facsimile terminal (IP-FAX terminal) 100 and a router 102 are connected to each other via a local area network (LAN). The IP-FAX terminal 100 is connected to the Internet INET via the router 102. In the similar manner, a receiving-side network system 20 has a structure in which an IP-FAX terminal 200 and a router 202 are connected to each other via a local area network (LAN). The IP-FAX terminal 200 is connected to the Internet INET via the router 202. The LAN may be a wired network according to IEEE802.3 or a wireless network according to IEEE802.11b/g/a.

The facsimile transmission system according to the first embodiment can be realized by using a telephone network (IP telephone network) based on the Internet. The IP telephone network can be realized by sending audio data obtained by converting audio signals to a predetermined data format in a peer-to-peer communication manner via the Internet. Here, the term "peer-to-peer communication" means a communication method which is capable of transmitting data without intervention of a specific server when transmitting data from networked devices on the sending side to network devices on the receiving side. In the first embodiment, an IP telephone network system by Skype (hereinafter, simply referred to as "Skype system", Skype: Trademark of Skype Technologies S.A) is used as the IP telephone network system in the peer-to-peer communication.

As shown in FIG. 1, in the Skype system, a plurality of super nodes SN1, SN2, and NS3 and a plurality of general nodes GN1 and GN2 are connected to the Internet INET. These super nodes SN1, SN2, and SN3 and the general nodes GN1 and GN2 (comprehensively referred to as "node") are computers used by users for performing verbal communication via the IP telephone network.

Various user statuses, for example whether a user is using the Skype system, (called "online status" or "presence") and information of the node used by the corresponding user are stored in the super nodes as user information of the Skype system in a distributed manner. The super nodes store connection information required for establishing communication via the Internet, such as IP addresses and TCP/IP communication ports, as node information. The user information is periodically transmitted to the super nodes from the nodes used by the users.

When a user of each of the nodes performs verbal communication using the Skype system, the user transmits a Skype name specifying a user of a calling destination. A calling-side node transmits the Skype name to the super node and requests provision of the user name of the calling destination. In the case in which the super node contains the user information of the calling destination, the super node transmits the user information of the calling destination to the calling-side node in reply to the request from the calling-side node. In the case in which the super node does not contain the user information of the calling destination, the super node demands the provision of the user information of the calling destination with respect to another calling destination. In this manner, the super node acquires the user information of the calling destination by transmission of the user information between the super nodes and transmits the acquired user information to the calling-side node.

In such a manner, in the Skype system, the calling-side node acquires the user information of the calling destination using the Skype name. Thus, it is possible to establish the peer-to-peer communication between the calling-side node and a calling destination-side node by establishing communication with the calling destination-side node by using connection information of the calling destination-side node contained in the user information.

Each of the two IP-FAX terminals 100 and 200 in the first embodiment functions as the general node of the Skype system. Accordingly, it is possible to perform the peer-to-peer communication between the two IP-FAX terminals 100 and 200 using the functions of the Skype system, and thus it is possible to transmit an image in a manner as described below. FIG. 1 shows an example in which both the sending-side and receiving-side are IP-FAX terminals, but it is satisfactory that either one of the sending-side and the receiving-side has the function of the IP-FAX terminal.

Figure 2:
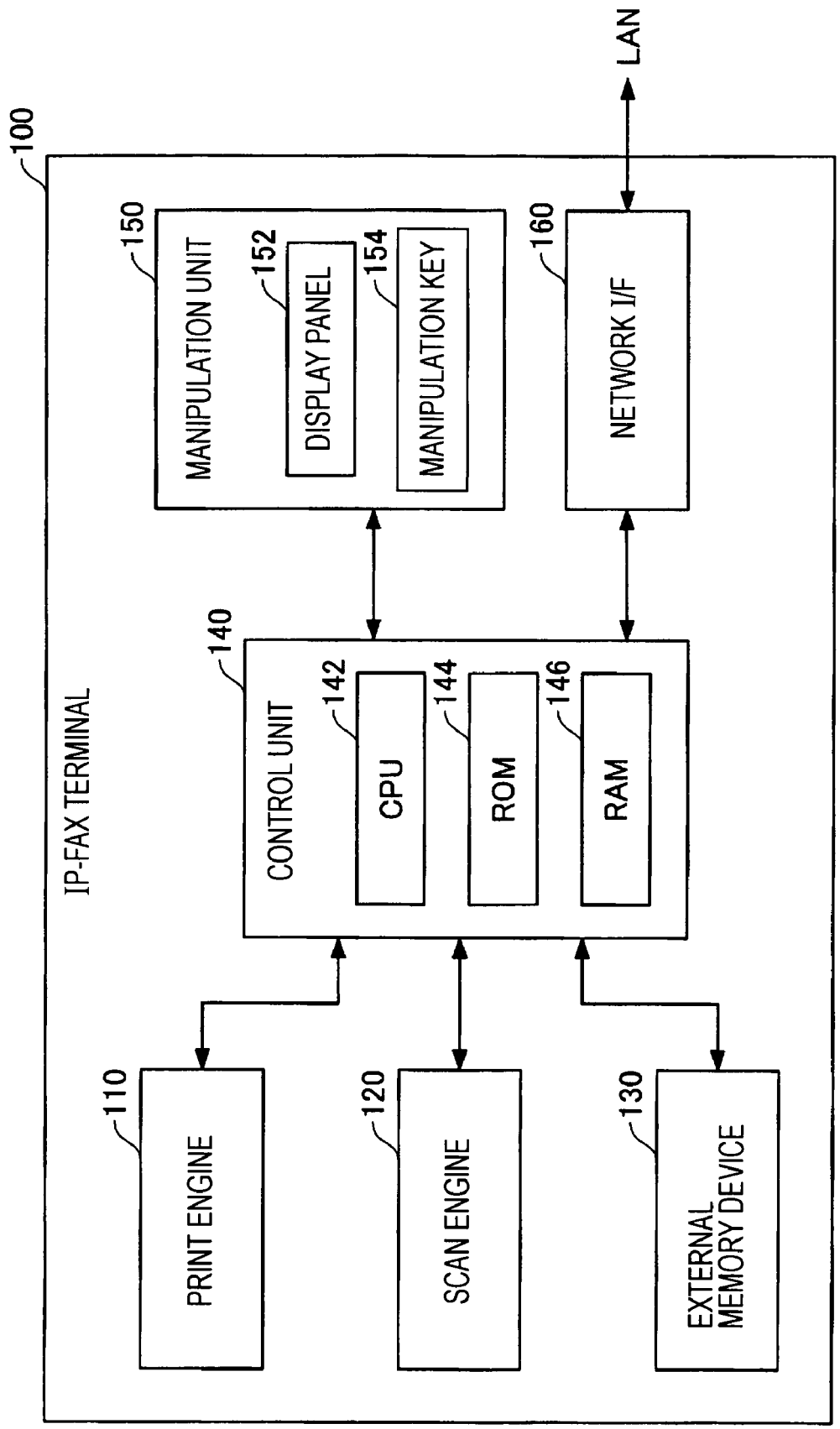
FIG. 2 is a block diagram illustrating an inside structure of a sending-side IP-FAX terminal 100.

FIG. 2 is a block diagram illustrating an inside structure of the sending-side IP-FAX terminal 100. The structure of the receiving-side IP-FAX terminal 200 (shown in FIG. 1) is the same as that of the sending-side IP-FAX terminal 100, and thus description of the IP-FAX terminal 200 will be omitted. The IP-FAX terminal 100 includes a print engine 101, a scan engine 120, an external memory device 130, a control unit 140, a manipulation unit 150, and a network interface (I/F) 160.

The control unit 140 includes a central processing unit (CPU) 142, a ROM 144, and a RAM 146. The CPU 142 performs various functions, which will be described below, by executing a program loaded in the ROM 144. In the first embodiment, the CPU 142 executes a program loaded in the ROM 144, but may execute a program loaded in the RAM 146. In such a case, the program to be executed by the CPU 142 is read from the ROM 144 or the external memory device 130 according to the circumstances and loaded into the RAM 146.

The network interface 160 transmits transmission data supplied from the control unit 140 to the LAN, and supplies the received data from the LAN to the control unit 140. The transmission data and the received data are loaded at a predetermined region (sending and receiving buffer) of the RAM 146.

The print engine 110 has a printing mechanism which performs printing in response to print data given thereto. The print data supplied to the print engine 110 is produced by way of operation that the CPU 142 analyzes the received data loaded in the sending and receiving buffer and performs color conversion processing and half tone processing. The produced print data is supplied from the print engine 110 to the control unit 140. The print data supplied to the print engine 110 can be produced on the basis of the image data loaded in the external memory device 130. The print engine 110 may be configured to perform functions of color conversion processing and half tone processing instead of the CPU 142.

The scan engine 120 has a function of producing scan data representing an image obtained by scanning the image. The scan data produced in the scan engine 120 is supplied to the control unit 140. The scan data supplied to the control unit 140 is converted to image data having a predetermined data format by the CPU 142, and loaded into the sending and receiving buffer. The image data loaded in the sending and receiving buffer is transmitted from the LAN via the network interface 160. The scan engine 120 can be configured to perform a function of producing image data on the basis of the scan data instead of the CPU 142.

The manipulation unit 150 includes a display panel 152 and a manipulation key 154. Various statuses of the IP-FAX terminal 100 is displayed on the display panel 152. The user of the IP-FAX terminal 100 can input various instructions to the IP-FAX terminal 100 by manipulating the manipulation key 154 while watching the information displayed on the display panel 152.

The IP-FAX terminal 100 can be constructed by employing terminals having a wake up on LAN (WOL) function. In this case, the IP-FAX terminal 100 is configured to fall to either one or both of a resting state in which functions of all of units 110 to 150 except for a function of the network interface 160 (shown in FIG. 2) stop and an operating state in which the entire units of the IP-FAX terminal 100 operate. The IP-FAX terminal 100 switches from the operating state to the resting state by way of operation that the network interface 160 operating in the resting state takes a packet. The switching from the operating state to the resting state is achieved by the lapse of a predetermined time after the IP-FAX terminal 100 is used for manipulation by the user or printing.

Figure 3:
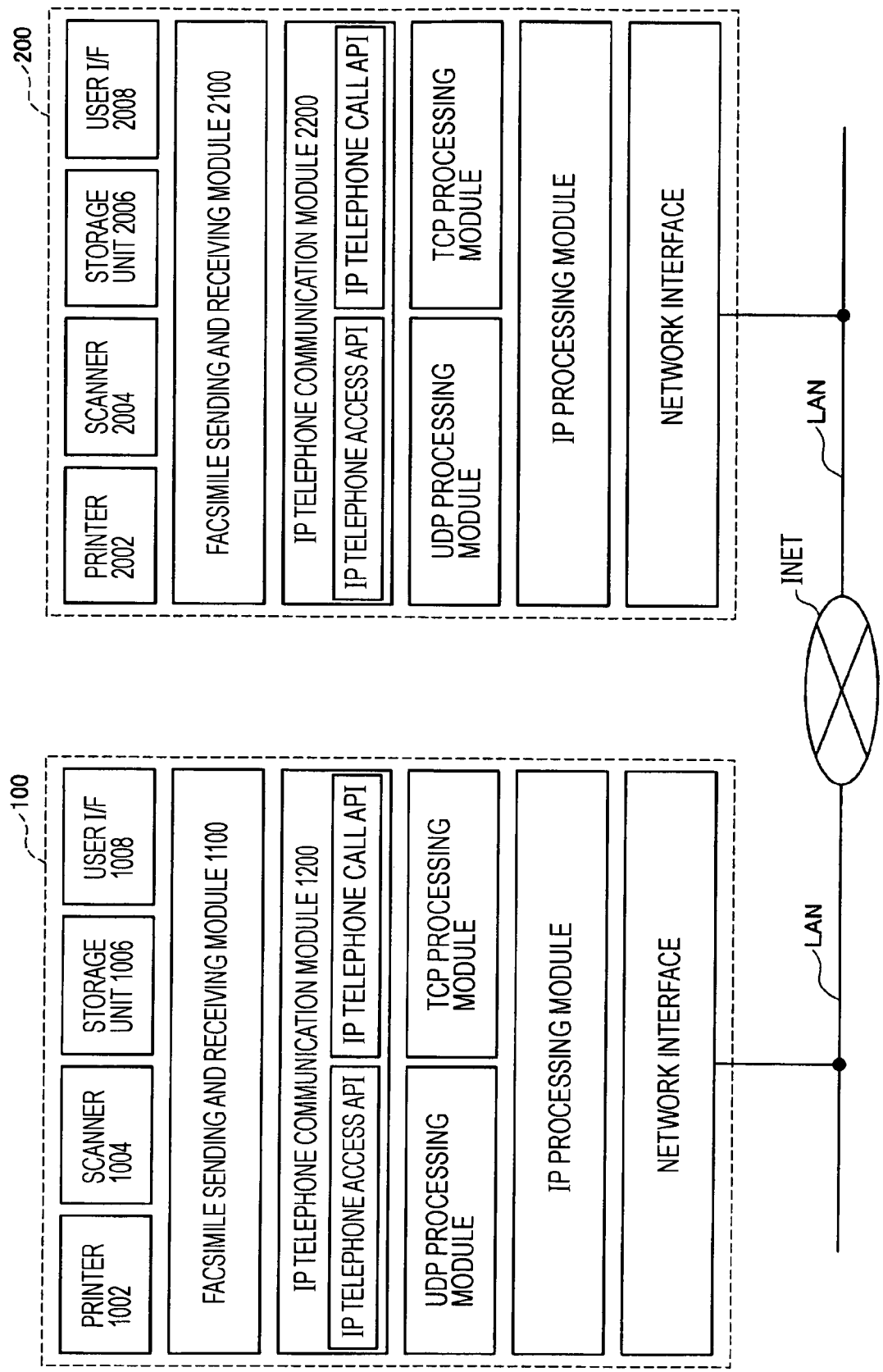
FIG. 3 is a block diagram illustrating a hierarchy of functions in association with facsimile transmission.

FIG. 3 is a block diagram illustrating a hierarchy of functions in association with the facsimile transmission. In FIG. 3, the routers 102 and 202 (shown in FIG. 1) disposed between the IP-FAX terminals 100 and 200 and the Internet INET are not shown.

Functions of a printer 1002, a scanner 1004, a storage unit 1006, and a user interface 1008 provided to the IP-FAX terminal 100 are the topmost-layered hierarchical functions. These functions are realized by way of operation that the control unit 140 (shown FIG. 2) of the IP-FAX terminal 100 controls corresponding mechanisms 110, 120, 130, and 150 (shown in FIG. 2). Further, since the functions of the receiving-side IP-FAX terminal 200 are the same as those of the sending-side IP-FAX terminal 100, description of the IP-FAX terminal 200 is omitted.

Under a layer of the printer 1002 and et. al, a facsimile sending and receiving module 1100, an IP telephone communication module 1200, a TCP and UDP protocol processing module, an IP processing module, and a network interface are disposed in order.

The IP telephone communication module 1200 processes data supplied from a lower-layered module according to various protocols used in the Skype system and provides the function provided by the Skype system to the facsimile sending and receiving module 1100 which is an upper layer. In addition to verbal communication function using the IP telephone network, the Skype system is provided with a variety of functions such as a chatting function (interaction in a manner of letter communication) and a file transmission function.

The facsimile sending and receiving module 1100 functions as a user of the Skype system to which a Skype name is allocated. The facsimile sending and receiving module 1100 can use the functions provided by the Skype system by sending a command to an access application program interface (API) and a calling API provided to the IP telephone communication module 1200.

Figure 4:
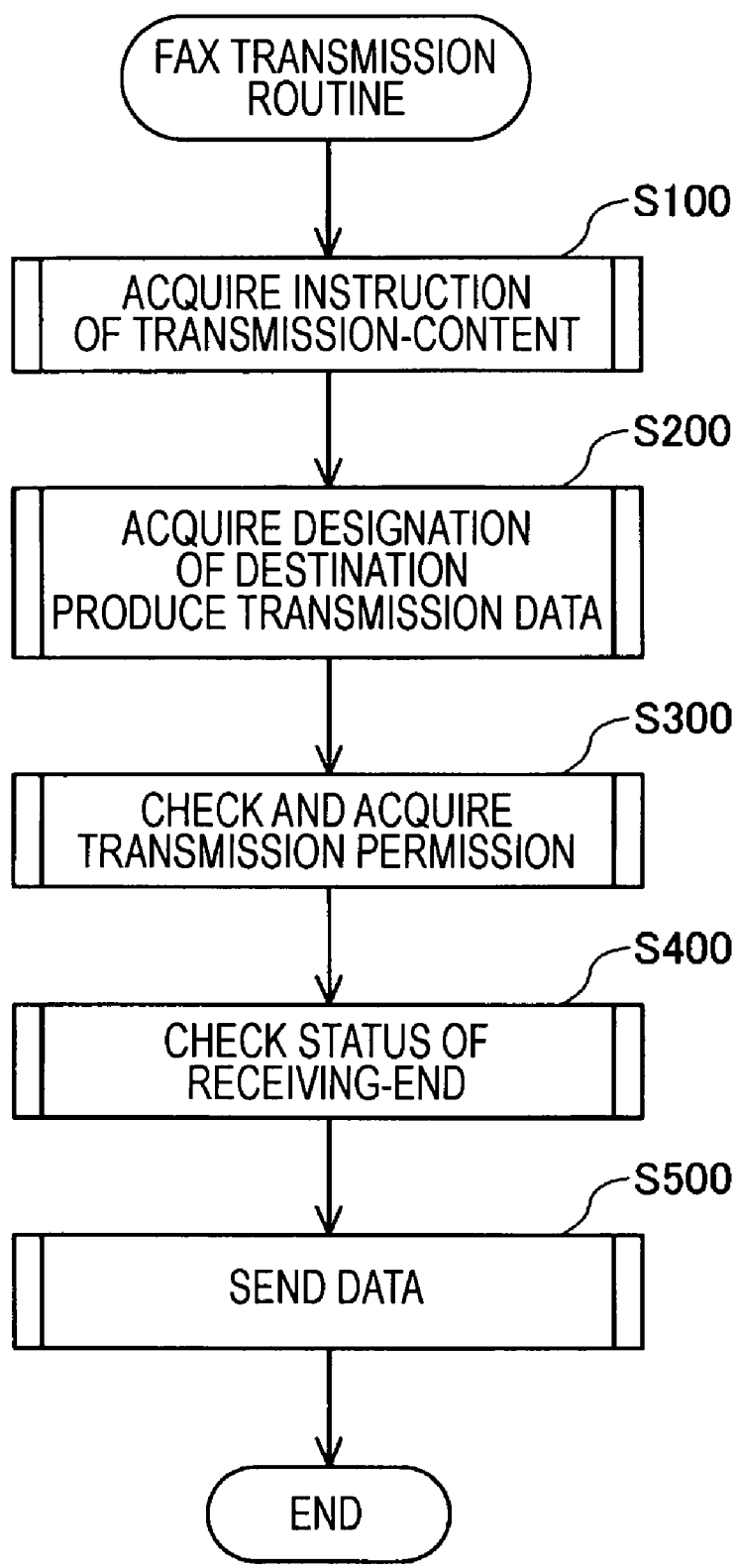
FIG. 4 is a flowchart illustrating a FAX transmission routine executed in the sending-side IP-FAX terminal 100 when transmitting an image by a facsimile transmission system.

FIG. 4 is a flowchart illustrating a FAX transmission routine executed in the sending-side IP-FAX terminal 100 when an image is transmitted by a facsimile transmission system.

Figure 5:
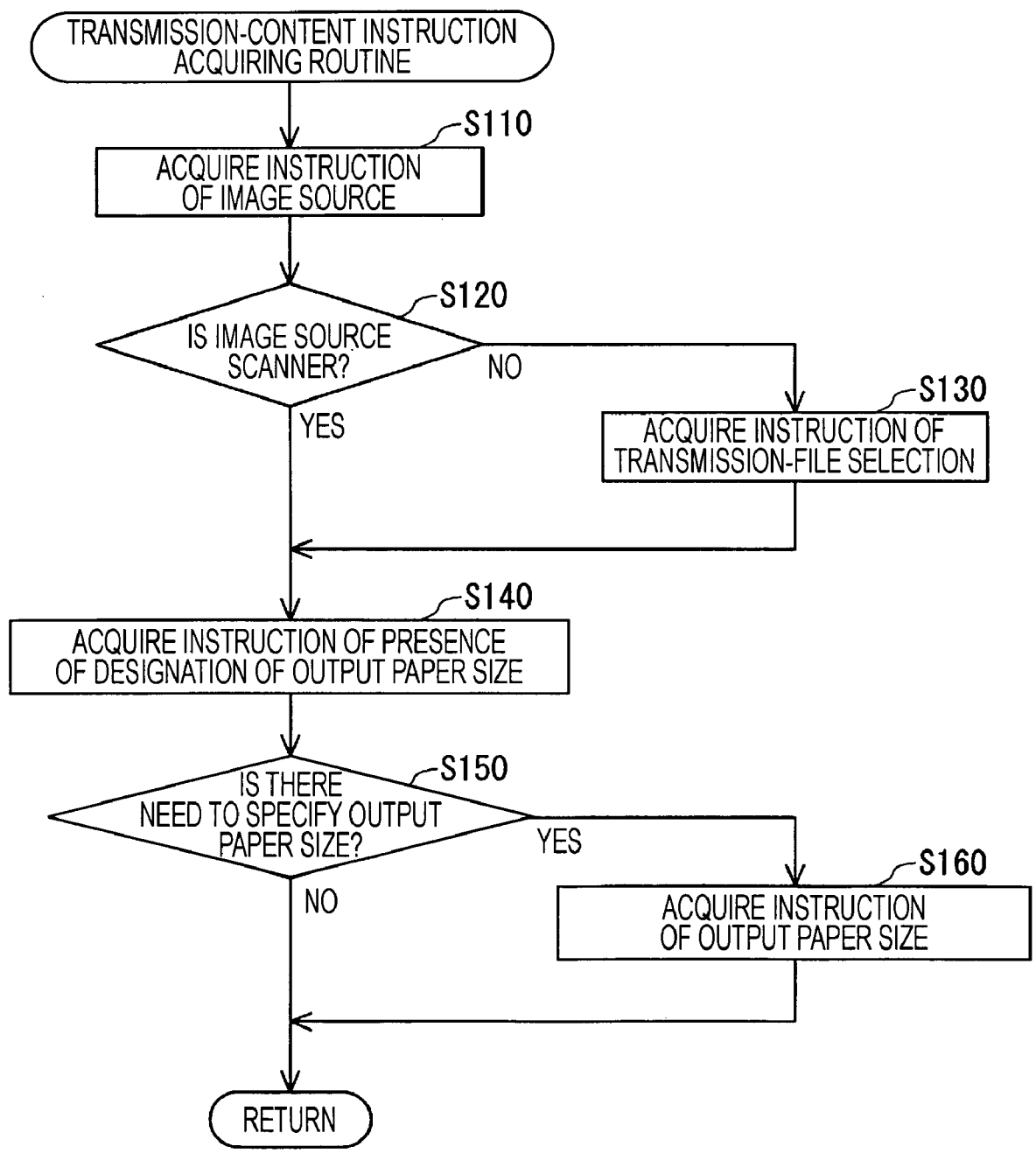
FIG. 5 is a flowchart illustrating a transmission content instruction acquiring routine executed in step S100 shown in FIG. 4.

In step S100, the facsimile sending and receiving module 1100 acquires an instruction in association with transmission content from a user. FIG. 5 is a flowchart illustrating a transmission content instruction acquiring routine executed by the facsimile sending and receiving module 1100 in step S100.

In step S110 shown in FIG. 5, the facsimile sending and receiving module 1100 acquires a user's instruction of selecting a source of an image to be transmitted. Thus, in step S120, it is determined that which of the scanner 1004 and the storage 1006 is the image source designated by the user. When the image source is the scanner 1004, a control process proceeds to step S140. On the other hand, when the image source is the storage 1006, the control process proceeds to step S130. In step S130, the user's instruction of selecting the file to be transmitted is acquired.

In step S140, the facsimile sending and receiving module 1100 acquires a user's instruction in association with presence of designation of paper size (output paper size) used for outputting an image on the receiving side. Thus, in step S150, it is determined whether the output paper size must be designated. In the case in which it is not required to designate the output paper size, the routine shown in FIG. 5 ends and the control process is returned to the FAX transmission routine shown in FIG. 4. On the other hand, in the case in which it is required to designate the output paper size, the control process proceeds to step S160, and the user's instruction of designating the output paper size is acquired, and then the routine shown in FIG. 5 ends. Then, the control process is returned to the FAX transmission routine shown in FIG. 4.

Figure 6:
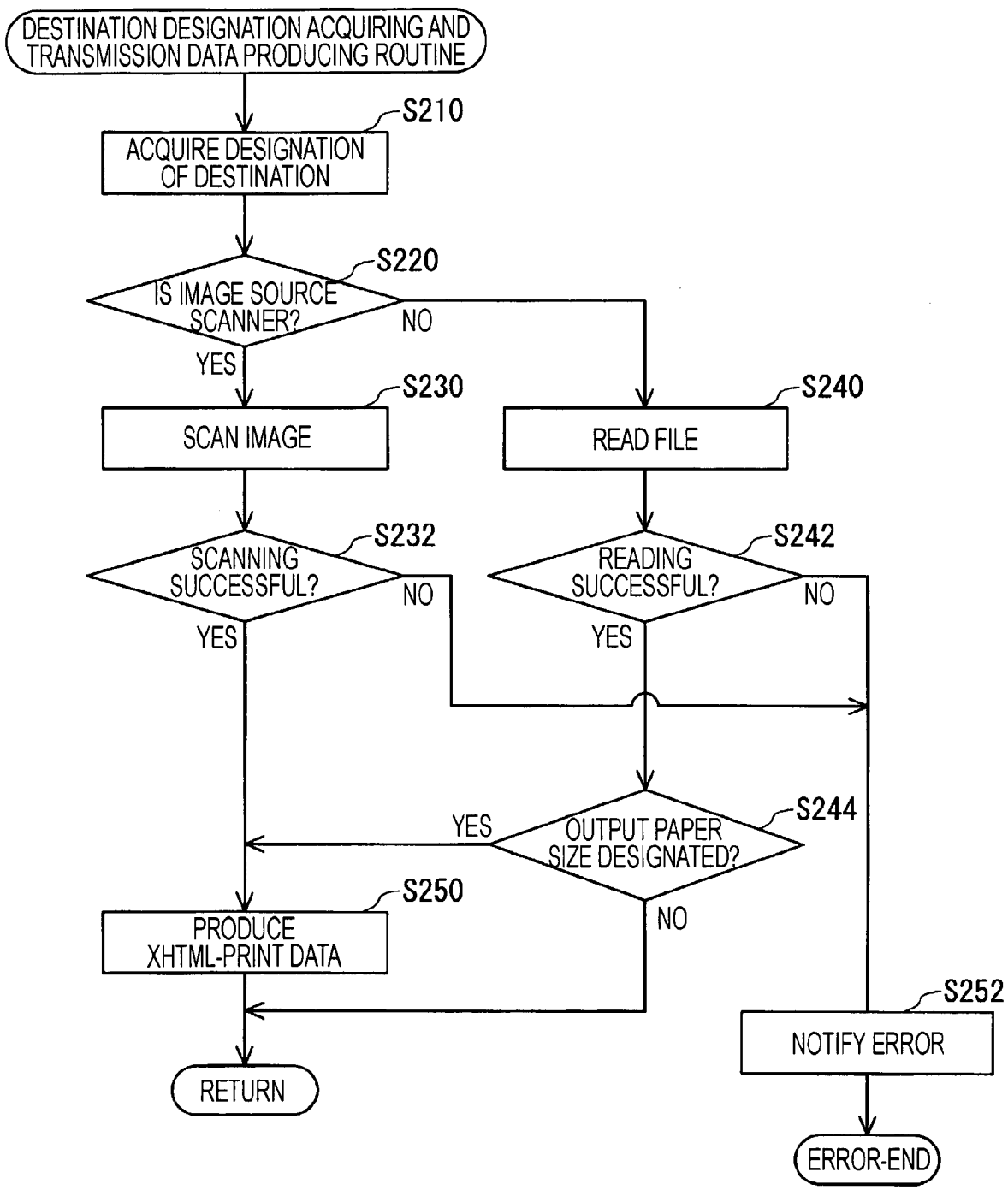
FIG. 6 is a flowchart illustrating a transmission destination designation acquiring and transmission data producing routine executed in step S200 shown in FIG. 4.

In step S200 shown in FIG. 4, the facsimile sending and receiving module 1100 acquires a user's instruction of designating a transmission destination from the user. In step S100, transmission data is produced on the basis of the instruction in association with transmission content. FIG. 6 is a flowchart illustrating the transmission destination designation acquiring and transmission data producing routine executed by the facsimile sending and receiving module 1100 in step S200.

In step S210 shown in FIG. 6, the transmission destination designated by the user is acquired. The transmission destination can be designated in a manner such that the user directly inputs the Skype name or selects the transmission destination from the list of contact addresses of the Skype system. When the transmission destination is selected from the list of contact addresses, it is preferable that presence of the transmission destination acquired by the super node is periodically shown in the list of contact addresses used for selecting the transmission destination. The facsimile sending and receiving module 1100 acquires the transmission destination designated by the user and then the control process proceeds to step S220 when it is detected that the user pressed a transmission button (not shown).

In step S220, it is determined that which of the scanner 1004 (shown in FIG. 3) and the storage unit 1006 (shown in FIG. 3) is the source of the image acquired in step S110 (shown in FIG. 5). In the case in which the source of the image is the scanner 1004, the control process proceeds to step S230. Conversely, in the case in which the image source is the storage unit 1006, the control proceeds to step S240.

In step S230, the facsimile sending and receiving module 1100 acquires image data from the scanner 1004. In step S232, it is judged whether acquisition of the image data is successful in step S230. In the case in which the acquisition of the image data is successful, the control process proceeds to step S250. On the other hand, the acquisition of the image data is failed, the control process proceeds to step S252.

In step S240, the facsimile sending and receiving module 1100 acquires the image data by reading the file selected by the user from the storage unit 1006. In step S242, it is judged whether the acquisition of the image data performed in step S240 is successful or not. When the acquisition of the image data is successful, the control process proceeds to step S244. On the another hand, when it is judged such that the acquisition of the image data is failed, the control process proceeds to step S252.

In step S244, the facsimile sending and receiving module 1100 judges whether the output paper size must be designated. In the case in which it is required to designate the output paper size, the control process proceeds to step S250. On the other hand, in the case in which it is not required to designate the output paper size, the routine shown in FIG. 6 ends and the control process is returned to the FAX transmission routine shown in FIG. 4.

In step S250, the facsimile sending and receiving module 1100 produces XHTML-Print data. Here, the term "XHTML-Print data" means data having a data format corresponding to print specification of a document described in XHTML (extensible Hyper Text Markup Language: a document description language compatible with HTML). The XHTML-Print data contains information used for controlling output such as output paper size and the number of copies and information used for specifying the image data to be transmitted.

In step S252, the facsimile sending and receiving module 1100 notifies the user the failure of the acquisition of the image. Then, the FAX transmission routine shown in FIG. 4 ends in err (err-end).

Figure 7:
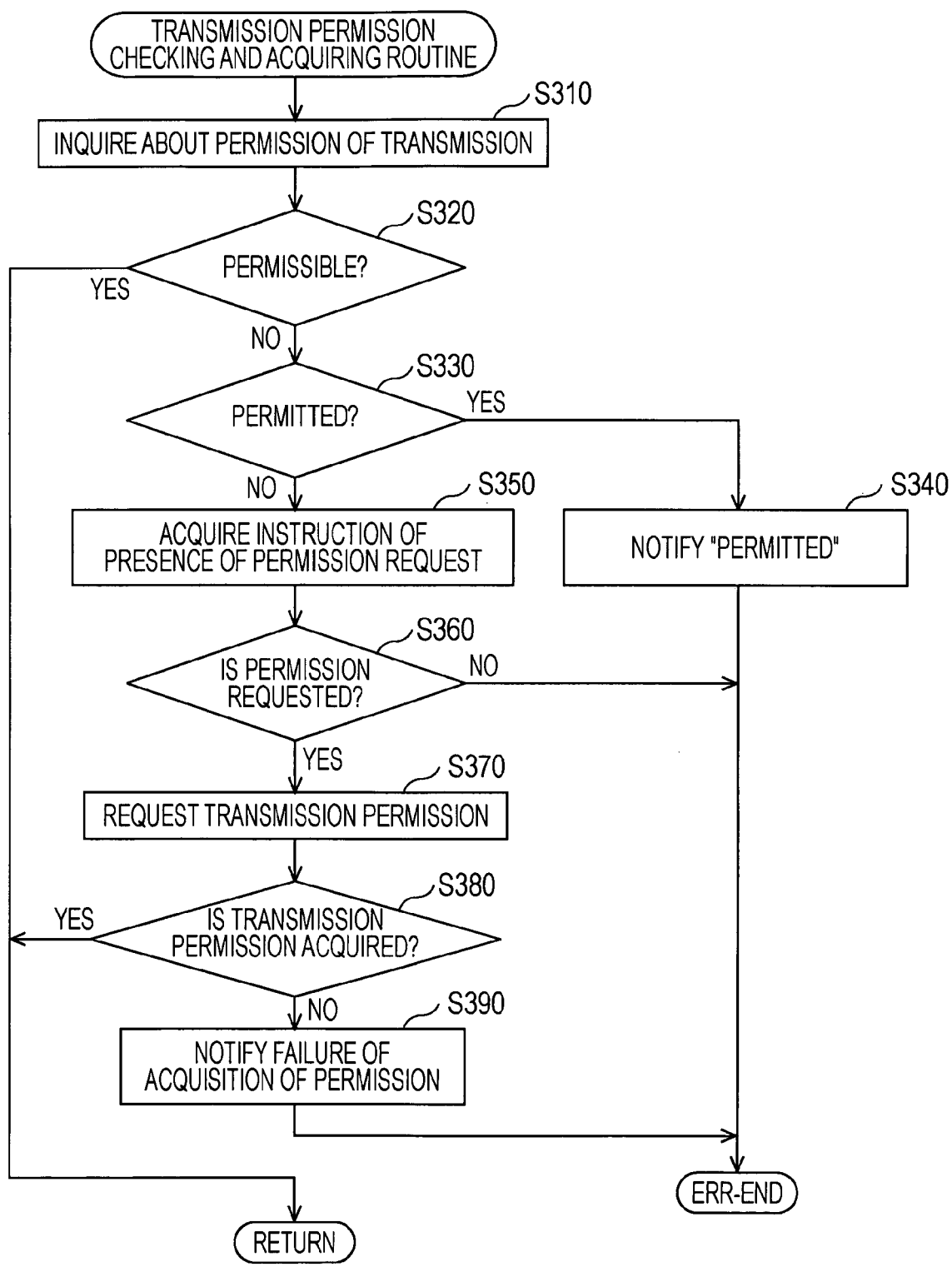
FIG. 7 is a flowchart illustrating a transmission permission checking and acquiring routine executed in step S300 shown in FIG. 4.

In step S300 shown in FIG. 4, the sending-side facsimile sending and receiving module 1100 checks whether the image transmission from the sending-side IP-FAX terminal 100 is permitted by the receiving-side IP-FAX terminal 200, and then acquires transmission permission if the need arises. FIG. 7 is a flowchart illustrating a transmission permission checking and acquiring routine executed by the facsimile sensing and receiving module 1100 in step S300.

In step S310 in FIG. 7, the facsimile sending and receiving module 1100 checks existence of permission of transmission from the sending-side IP-FAX terminal 100. In greater detail, the facsimile sending and receiving module 1100 transmits the Skype name of the sending-side IP-FAX terminal 100 to the super node of the Skype system. Then, it checks whether the Skype name on the sending side is registered in the list of contact addresses of the receiving-side IP-FAX terminal 200. The super node transmits contact address status BuddyStatus in response to the checking.

The contact address status transmitted by the super node of the Skype system and the contents thereof are shown in table 1.

TABLE 1

| Values of contact address status | Skype system | Status of transmission permission of IP-FAX |
|---|---|---|
| 0 | Has not ever been registered in the list of contact addresses | Impermissible |
| 1 | Deleted from the list of contact addresses | |
| 2 | Permitted | Permitted |
| 3 | Added to the list of contact addresses | Permissible |

In step S320, the facsimile sending and receiving module 1100 judges whether the transmission permission is obtainable from the contact address status received in step S310. In the case in which the transmission permission is obtainable (contact address status=3), the routine shown in FIG. 7 ends, and the control process is returned to the FAX transmission routine shown in FIG. 4. On the other hand, in the case in which the transmission permission is not obtainable (contact address status=0 to 2), the control process proceeds to step S330.

In step S330, the facsimile sending and receiving module 1100 judges whether the transmission is permitted or not from the contact address status transmitted as a reply in step S310. In the case in which the transmission is permitted (contact address status=2), the control process proceeds to step S340. In step S340, the effect "transmission is permitted" is notified to the user. Thus, the FAX transmission routine shown in FIG. 4 ends in err (error-end). On the other hand, in the case in which the transmission is not permitted (contact address status=0, 1), the control process proceeds to step S350.

In step S350, the facsimile sending and receiving module 1100 notifies the user that the transmission is not permitted, and also acquires a user's instruction whether to request the transmission permission. Thus, in step S360, it is judged whether the transmission permission is requested in the user's instruction. In the case in which the user's instruction represents a request of the transmission permission, the control process proceeds to step S370. On the other hand, in the case in which the user's instruction does not represent the request of the transmission permission, the FAX transmission routine shown in FIG. 4 ends in error (error-end).

In Step S370, the facsimile sending and receiving module 1110 requests the receiving-side IP-FAX terminal 200 the transmission permission. At this time, the IP telephone communication module 2200 (shown in FIG. 3) on the receiving side inquires a user of the receiving-side IP-FAX terminal 2200 whether to grant the transmission permission via the user interface 2008. Thus, in the case in which the user of the receiving-side IP-FAX terminal 200 grants the transmission permission, the contact address status (=3), which means "transmissible" is transmitted to the sending-side IP-FAX terminal 100 as a reply. On the other hand, in the case in which the user of the receiving-side IP-FAX terminal 200 does not grant the transmission permission, the contact address status (=0), which means "not transmissible" is transmitted to the sending-side IP-FAX terminal.

In step S380, the facsimile sending and receiving module 1100 judges whether the transmission permission is granted from the contact address status, which is transmitted in step S370. In the case in which the transmission is permitted (contact address status=3), the routine shown in FIG. 7 ends and the control process is returned to the FAX transmission routine shown in FIG. 4. On the other hand, in the case in which the transmission permission is not granted (contact address status=0 to 2), the control process proceeds to step S390. In step S390, the user is notified that the transmission permission is not granted. Thus, the FAX transmission routine shown in FIG. 4 ends in error (err-end).

Figure 8:
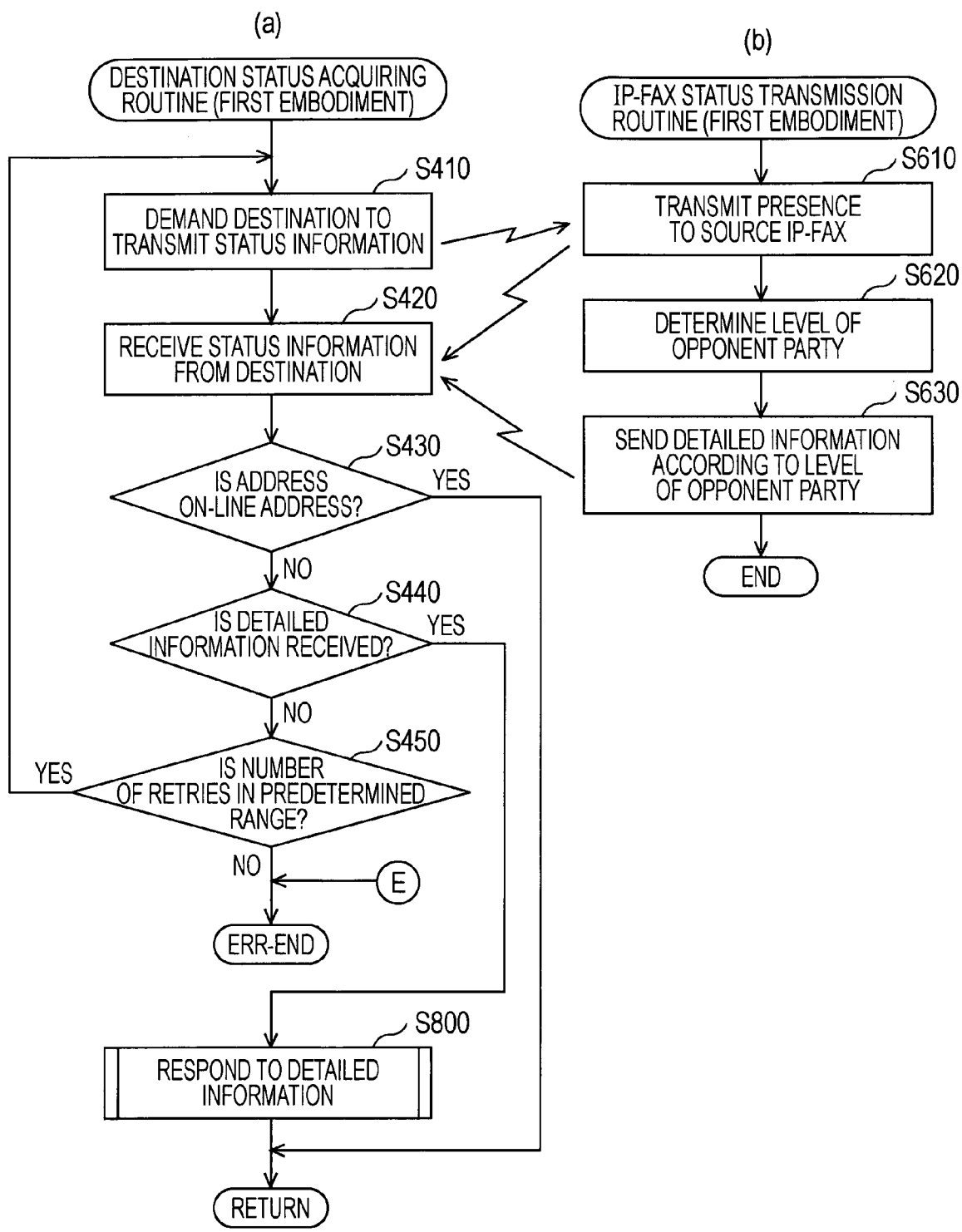
FIG. 8 is a flowchart illustrating a transmission destination status checking routine executed in step S400 shown in FIG. 4.

In step S400 shown in FIG. 4, the facsimile sending and receiving module 1100 checks status of the transmission destination. FIG. 8 is a flowchart illustrating a transmission destination status checking routine executed by the facsimile sending and receiving module 1100 in Step S400. FIG. 8(a) is a flowchart illustrating a transmission destination status acquiring routine executed by the sending-side facsimile sending and receiving module 1100 in step S400. FIG. 8(b) is a flowchart illustrating an IP-FAX status sending routine executed by the receiving-side facsimile sending and receiving module 2100.

In step S410 shown in FIG. 8(a), the sending-side facsimile sending and receiving module 1100 requests transmission of device status with respect to the receiving-side IP-FAX terminal 200. In greater detail, the facsimile sending and receiving module 1100 requests transmission of the presence of the receiving side IP-FAX terminal 200. The receiving side facsimile sending and receiving module 2100 transmits the presence representing the status of the receiving-side IP-FAX terminal 200 in step S610 shown in FIG. 8(b).

The sending-side facsimile sending and receiving module 1100 preliminarily acquires connection information of the receiving-side IP-FAX terminal 200 from the super node at specific timing between step S210 (shown in FIG. 6) and step S410. A request for device information, given to receiving-side IP-FAX terminal 200, is performed by the peer-to-peer communication established between the sending-side IF-FAX terminal 100 and the receiving-side IF-FAX terminal 200 on the basis of the acquired connection information. In the case in which the receiving-side IP-FAX terminal 200 has a wake up on LAN function, the receiving-side IP-FAX terminal 200 takes a packet transmitted from the sending-side IP-FAX terminal 100 when establishing the peer-to-peer communication, and thus its state is changes from the resting state to the operating state.

The correspondence relationship between the presence transmitted by the receiving-side IP-FAX terminal 200 as a reply and the status of the receiving-side IP-FAX terminal 200 is as follows: As shown in table 2, of various kinds of presence used in the Skype system, two kinds of presence ONLINE and NA are used for representing the status of the receiving-side IP-FAX terminal 200. The presence ONLINE represents a FAX receivable state of the receiving-side IP- FAX terminal 200, that is, the state in which print corresponding to the received data can be performed according to the received data. On the other hand, the presence (non-available) NA represents a FAX unreceivable state, that is, the state in which print corresponding to the received data cannot be performed.

TABLE 2

| Presence | Skype system | Status of IP-FAX |
|---|---|---|
| UNKNOWN | Unknown user | — |
| OFFLINE | User is off line (not connected) | — |
| ONLINE | User is on line | Receivable state |
| AWAY | Temporal leaving | — |
| NA | User is unavailable | Unreceivable state |
| DND | Busy | — |

Next, the receiving-side facsimile sending and receiving module 2100 determines an opponent level of the sending-side IP-FAX terminal 100 which requested transmission of the status information in step S620. The term "opponent level" is an indication representing degree of reliability of an opponent which requested transmission of the status information. The opponent level is a factor for classifying opponents into three levels (classes), for example, "unreliable" (opponent level 1), "reliable" (opponent level=2), and "fairly reliable" (opponent level=3) according to reliabilities thereof.

In detail, the determination of the opponent level is done on the basis of an IP address of the sending-side IP-FAX terminal 100, which is contained in a message (status information request message) which is transmitted by the sending-side IP-FAX terminal 100 when the sending-side facsimile sending and receiving module 100 requests transmission of the status information with respect to the receiving-side IP-FAX terminal 200 in step S410 shown in FIG. 8(a). The receiving-side facsimile sending and receiving module 2100 determines an opponent level of the sending-side IP-FAX terminal 100 by referencing a table showing the relationship between the IP address and the opponent level.

Further, in the first embodiment, the opponent level of the sending-side IP-FAX terminal 1100 is determined on the basis of the IP address contained in the status information request message, but the opponent level is generally contained in a request message of the status information of the receiving-side IP-FAX terminal 200, and can be determined according to certain information which can be specified by the transmission destination. For example, in the case in which the request message of the status information contains the Skype name or an individual identification number of the sending-side IP-FAX terminal 100, the opponent level can be determined according to such information.

In step S630 shown in FIG. 8(b), the receiving-side facsimile sending and receiving module 2100 transmits the detailed information to the sending-side IP-FAX terminal 100 according to the opponent level determined in step S620. The correspondence relationship between the opponent level and the detailed information, which is transmitted, can be, for example, any of ones shown in table 3.

TABLE 3

| Detailed information | | Opponent level | | |
|---|---|---|---|---|
| Item | Content | 1 | 2 | 3 |
| Print remaining time | Remaining time of printing processing in operation of a receiving-side terminal | X | ○ | ○ |
| Remaining amount of expendables | Remaining amount of expendables such as ink and paper | X | ○ | ○ |
| Remaining capacity of memory | Capacity of empty space of a memory, which can be usable for Fax reception | X | ○ | ○ |
| Transmission destination information (1) | Transmission destination (office) which can be notified to an opponent having reliability. | X | ○ | ○ |
| Failure information | Failure content of a receiving-side terminal | X | X | ○ |
| Return information | Return plan of a user of a receiving-side terminal (Scheduled return day on travel) | X | X | ○ |
| Transmission destination information (2) | Transmission destination (friend or the like) which can be notified to only a fairly reliable opponent | X | X | ○ |

In this table, items and contents of the detailed information which is transmitted according to the opponent level are represented by "O" and "X". In the case of the unreliable opponent, that is, in the case that the opponent level is "1", any of the item of the detailed information is not transmitted. In the case of reliable opponent, that is, in the case in which the opponent level is "2", print remaining time, remaining amount of expendables, remaining capacity of memory, and first transmission destination information of the items of the detailed information are transmitted. The first transmission destination information designates a transmission destination which can be notified to an opponent, which can be reliable, such as a facsimile device of an office. In the case of a fairly reliable opponent, that is, the opponent level is "3", in addition to the information transmitted in the case in which the opponent level is "2", failure information, return information, and second transmission destination information are transmitted. For example, transmission destinations which be notified to only fairly reliable opponents such as facsimiles of friends are designated in the second transmission destination information.

In step S420 shown in FIG. 8(a), the sending-side facsimile sending and receiving module 1100 receives status information transmitted from the receiving-side IP-FAX terminal 200 in step S610 and S630 shown in FIG. 8(b). The receiving-side IP-FAX terminal 200 transmits the presence and the detailed information by two times of sending operations, for example in step S610 and step S630, but may transmit the presence and the detailed information at a time.

In step S430, the sending-side facsimile sending and receiving module 1100 judges whether the presence is online (ONLINE) or not, from the status information which is received in step S420. In the case in which the presence is online (ONLINE), that is, in the case in which the receiving-side IP-FAX terminal 200 is a printable state, the routine shown in FIG. 8(a) ends, and the control process is returned to the FAX transmission routine shown in FIG. 4. On the other hand, in the case in which the presence is not online (NA), that is, in the case in which the receiving-side IP-FAX terminal 200 is in an unprintable state, the control process proceeds to step S440.

In step S440, the sending-side facsimile sending and receiving module 1100 judges whether the detailed information is received or not in step S420. In step S420, in the case in which the detailed information is received, the control process proceeds to step S800. On the other hand, in the case in which the detailed information is not received, the control process proceeds to step S450. In step S450, until the number of rewrites reaches a predetermined number, the control process proceeds to step S410. When the number of rewrites becomes the predetermined number, the FAX routine shown in FIG. 4 ends in error (err-end).

Figure 9:
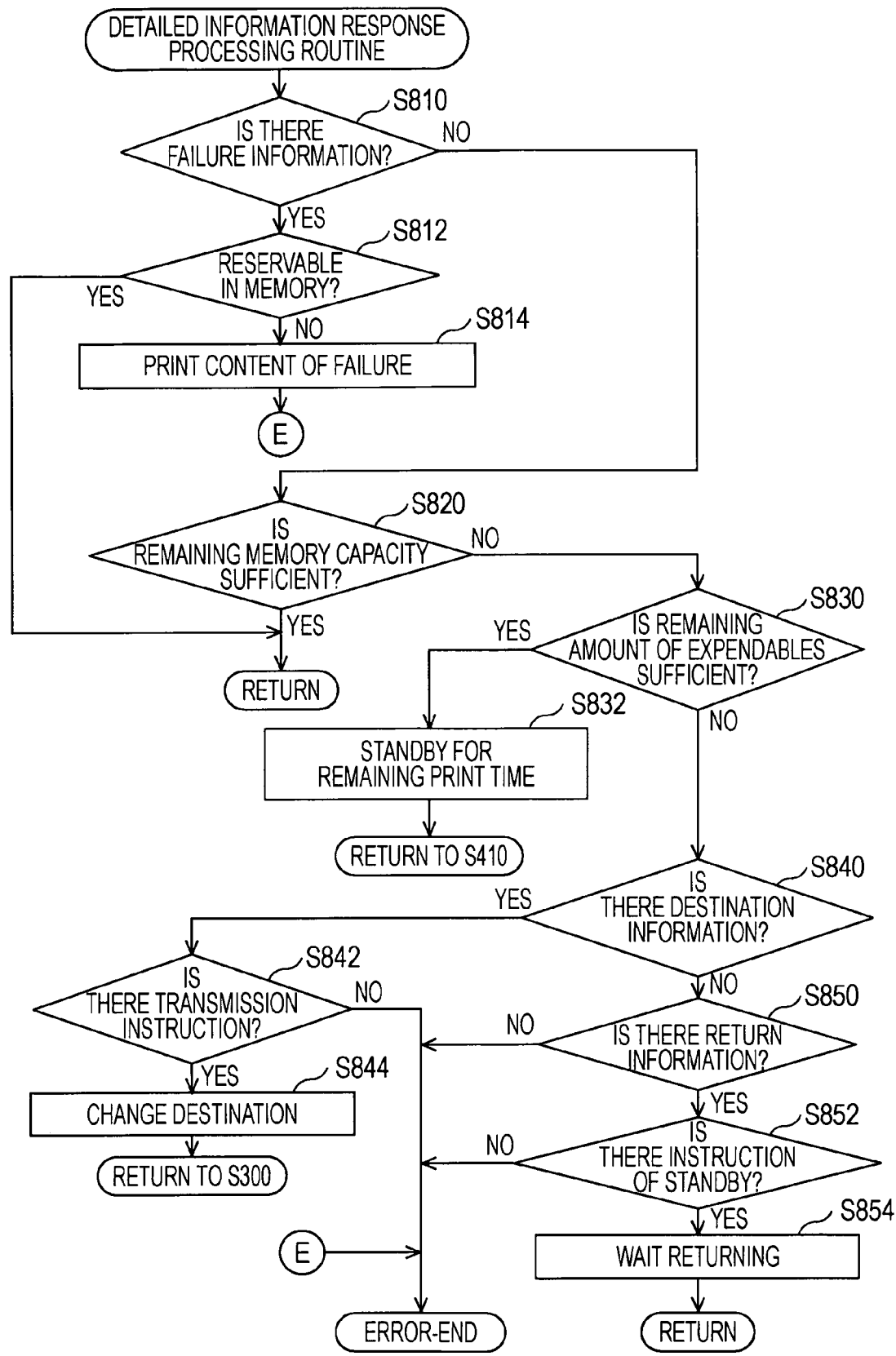
FIG. 9 is a flowchart illustrating a detailed information correspondence processing routine executed in step S800 shown in FIG. 8.

In step S800, the sending-side facsimile sending and receiving module 1100 performs processing corresponding to the detailed information acquired in step S420. FIG. 9 is a flowchart illustrating a detailed information correspondence processing routine executed by the facsimile sending and receiving module 1100 in step S800.

In step S810, the facsimile sending and receiving module 1100 judges whether the detailed information contains the failure information representing the failure content of the receiving-side IP-FAX terminal 200. In the case in which the detailed information does not contain the failure information, the control process proceeds to step S820. In the case in which the detailed information contains the failure information, the control process proceeds to step S812.

In step S812, the facsimile sending and receiving module 1100 judges whether the receiving-side IP-FAX terminal 200 can store the received data to a memory provided to the receiving-side IP-FAX terminal 200. In greater detail, the facsimile sending and receiving module 1100 judges whether failure of the receiving-side IP-FAX terminal 200 is failure with which data can be stored in the memory by analyzing the failure information. Then, the size of transmission data (transmission data size) produced in the transmission data producing routine in FIG. 6 is compared with the empty space of the memory (remaining capacity of memory), which is contained in the detailed information. Thus, in the case in which the receiving-side IP-FAX terminal 200 can store the data into the memory and in the case in which the remaining capacity of the memory is larger than the size of the transmission data, it is judged such that the data can be stored in the memory. In the case in which it is judged such that the data can be stored in the memory, the routine shown in FIG. 9 ends, and the control process is returned to the FAX transmission routine shown in FIG. 4. Conversely, in the case in which it is judged such that the data cannot be stored in the memory, the control process proceeds to step S814.

In step S814, the facsimile sending and receiving module 1100 prints the failure content. In greater detail, a document for notifying the user the failure content is produced on the basis of the information contained in the failure information. Then, the produced document is supplied to the printer 1002 (shown in FIG. 3), and thus the document for notifying the failure content of the receiving-side IP-FAX terminal 200 is printed. After printing the document for notifying the failure content, the FAX transmission routine shown in FIG. 4 ends in error (err-end).

In step S820, the facsimile sending and receiving module 1100 judges whether the remaining capacity of the memory of the receiving-side IP-FAX terminal 200 is enough or not. In the case in which the remaining capacity of the memory is enough, the routine shown in FIG. 9 ends, and the control process is returned to the FAX transmission routine shown in FIG. 4. In the case in which the remaining capacity of the memory is not enough, the control process proceeds to step S830.

In step S830, the facsimile sending and receiving module 1100 judges whether the remaining amount of the expendables such as paper and ink is enough. In greater detail, the usage of the expendables is predicted on the basis of the transmission data produced by the transmission data producing routine shown in FIG. 6, and the predicted usage and the remaining amount of the expendables are compared with each other. Thus, in the case in which the remaining amount of the expendables is larger than the predicted usage, it is judged such that the remaining amount of the expendables is enough, and the control process proceeds to step S832. On the other hand, in the case in which the remaining amount of the expendables is not enough, the control process proceeds to step S840.

In step S832, the facsimile sending and receiving module 1100 is on standby until the print remaining time contained in the detailed information passes. Thus, after the lapse of the print remaining time, the control process is returned to step S410 shown in FIG. 8.

In step S840, the facsimile sending and receiving module 1100 judges whether the detailed information contains the transmission destination information or not. In the case in which the transmission destination information is contained in the detailed information, the control process proceeds to step S842. On the other hand, in the case in which the transmission destination information is not contained in the detailed information, the control process proceeds to step S850.

In Step S842, the facsimile sending and receiving module 1100 asks the user that the transmission must be performed or not and judges whether a user's instruction acquired from the user is an instruction representing transmission (transmission instruction). In greater detail, the user's instruction is acquired from the user by performing data exchange with the user interface 1008 (shown in FIG. 3). In the case in which the user's instruction is the transmission instruction, the control process proceeds to step S844. On the other hand, in the case in which the user's instruction is not the transmission instruction, the FAX transmission routine shown in FIG. 4 ends in error (err-end).

When the user's instruction is acquired, the transmission destination and a message demanding user's input which represents determination whether the transmission must be performed or not are displayed on a display panel 152 shown in FIG. 2. Next, the user inputs his or her instruction by manipulating the manipulation key 154 (shown in FIG. 2) in response to the message displayed on the display panel 152. In the case in which the detailed information contains a plurality of transmission destination information, transmission destinations corresponding to the plurality of transmission destination information are displayed on the display panel 152. The user inputs whether to transmit and which of the plurality of transmission destinations is intended for the transmission using the manipulation key 154.

In step S844, the facsimile sending and receiving module 1100 changes destination of the data to the transmission destination. As described above, in the case in which the plurality of transmission destination information is contained in the detailed information, the destination of the data is changed to the transmission destination selected by the user. After changing the destination of the data, the control process is returned to step S300 shown in FIG. 4.

In step S850, the facsimile sending and receiving module 1100 judges whether the return information is contained in the detailed information or not. In the case in which the return information is contained in the detailed information, the control process proceeds to step S852. On the other hand, in the case in which the return information is not contained in the detailed information, the FAX transmission routine shown in FIG. 4 ends in error (err-end).

In step S852, the facsimile sending and receiving module 1100 asks the user whether the IP-FAX must be on standby for transmission until the user returns and judges whether an instruction acquired from the user represents standby (standby instruction). In the case in which the user's instruction is the standby instruction, the control process proceeds to step S854. On the other hand, in the case in which the user's instruction is not the standby instruction, the FAX transmission routine shown in FIG. 4 ends in error (err-end).

In step S854, the facsimile sending and receiving module 1100 requests again transmission of the status information of the sending destination after the standby until the return time contained in the detailed information comes. In the case in which it is judged such that the receiving-side IP-FAX terminal 200 is in printable state (presence=ONLINE) from the status information which is reacquired, the routine shown in FIG. 9 ends, and the control process is returned to the FAX transmission routine shown in FIG. 4. On the other hand, in the case in which it is judged such that the receiving-side IP-FAX terminal 200 is in unprintable state (presence=NA), the status information is repeatedly acquired until the number of retries becomes a predetermined number. Further, in the case in which the receiving-side IP-FAX terminal 200 does not fall to a printable state until the number of retries becomes the predetermined number, the FAX transmission routine shown in FIG. 4 ends in error (error-end).

In step S500 shown in FIG. 4, the facsimile sending and receiving module 1100 transmits the data produced in step S200 to the receiving-side IP-FAX terminal 200. FIG. 10(a) is a flowchart illustrating a data transmission routine executed by the sending-side facsimile sending and receiving module 1100 in step S500, and FIG. 10(b) is a flowchart illustrating a data receiving routine executed by the receiving-side facsimile sending and receiving module 2100.

In step S510 shown in FIG. 10(a), the facsimile sending and receiving module 1100 judges whether the sending destination is an IP-FAX terminal or not. In greater detail, the sending destination includes the facsimile sending and receiving module 2100 and it is judged whether the sending destination has a function of the IP-FAX terminal. In the case in which the sending destination is the IP-FAX terminal, the control process proceeds to step S520. On the other hand, in the case in which the sending destination is not an IP-FAX terminal, the control process proceeds to step S540. Further, whether the sending destination is an IP-FAX terminal or not can be judged by whether the Skype name of the transmission destination contains a specific character string.

In step S520, the facsimile sending and receiving module 1100 judges whether the XHTML-Print data is produced in step S250 shown in FIG. 6. In the case in which the XHTML-Print data is produced, the control process proceeds to step S530. On the other hand, in the case in which the XHTML-Print data is not produced, the control process proceeds to step S540.

In step S530, the facsimile sending and receiving module 1100 produces single transmission datum (wrapping) on the basis of the XHTML-Print data and the transmitted image data. The wrapping of data can be performed by encoding the XHTML-Print data and the image data into Multipurpose Internet Mail Extension (MIME) format. Further, since the transmission data, which have undergone the wrapping, is still the data representing an image, we can say that the transmission data produced in step S530 is the image data.

In step S540, the facsimile sending and receiving module 1100 transmits the transmission data to the receiving-side facsimile sending and receiving module 2100 (shown in FIG. 3) using a file transmission function of the Skype system. Thus, the data transmission routine shown in FIG. 10(a) ends. In the case in which the data wrapping in step S530 is performed, the produced single transmission datum is transmitted in step S540. On the other hand, in the case in which the data wrapping is not performed in step S530, the image data and the XHTML-Print data, if it is produced, are transmitted as the transmission data without being converted to audio signals in step S540.

Execution of the data receiving routine shown in FIG. 10(b) comes to start by the data transmission performed in step S540 shown in FIG. 10(a).

In step S540 shown in FIG. 10(a), the transmission data transmitted by the sending side facsimile sending and receiving module 1100 is received by the receiving-side facsimile sending and receiving module 2100 in step S710 shown in FIG. 10(b). In the case in which the sending side does not have a function of the IP-FAX terminal such as a personal computer, processing on the receiving-side ends after receiving the transmission data.

In step S712, the facsimile sending and receiving module 2100 transmits a message representing completion of reception of the transmission data to the sending-side facsimile sending and receiving module 1100. The sending-side facsimile sending and receiving module 1100 notifies the user of the sending-side IP-FAX terminal 100 the completion of the transmission of the transmission data after it receives the message. Further, in the case in which the sending-side is not the IP-FAX terminal, step S712 is omitted.

In step S720, the facsimile sending and receiving module 2100 judges whether the received transmission data has undergone the wrapping or not. In the case in which the wrapping did not performed, the control process proceeds to step S730. In step S730, the image data and the XHTML-Print data, which are original data existing before the wrapping, are extracted from the transmission data.

In step S740, the facsimile sending and receiving module 2100 judges whether printing of the transmission data is executable or not. In the case in which the printing of the transmission data is not executable, the control process proceeds to step S750. On the other hand, in the case in which the printing of the transmission data is executable, the control process proceeds to step S760.

In step S750, the facsimile sending and receiving module 2100 stores the transmission data into the RAM 146 (shown in FIG. 2) or the external memory device 130 (shown in FIG. 2). After the transmission data is stored, the routine shown in FIG. 10(b) ends. The transmission data stored in step S750 is printed by the receiving-side facsimile sending and receiving module 2100 when the IP-FAX terminal 200 is in the printable state.

In step S760, the image is output from the printer 2002 (shown in FIG. 3) on the basis of the content of the transmission data. In the case in which the transmission data contains the XHTML-Print data, the printing is executed according to the output paper size and the number of copies which are designated in the XHTML-Print data. On the other hand, in the case in which the transmission data does not contain the XHTML-Print data, the image represented by the image data is output on default paper.

In step S762, the facsimile sending and receiving module 2100 transmits a message that the printing of the transmission data is completed to the sending-side facsimile sending and receiving module 1100. The sending-side facsimile sending and receiving module 1100 notifies the user of the sending-side IP-FAX terminal 100 that the printing of the transmission data is completed after receiving the message. In the case in which the sending side is not the IP-FAX terminal, step S762 is omitted.

In step S770, the facsimile sending and receiving module 2100 deletes the transmission data. Then, the routine shown in FIG. 10(*b*) ends.

In this manner, in the first embodiment, the receiving-side IP-FAX terminal 200 can change the content of the status information to be transmitted to the sending-side IP-FAX terminal 100 according to the opponent level of the sending-side IP-FAX terminal. Accordingly, it is possible to prohibit the transmission of the information which would not be transmitted to unreliable opponents, and to enable necessary information to be transmitted to reliable opponents.

Further, in the first embodiment, the Skype system performing the peer-to-peer communication for performing communication between two IP-FAX terminals 100 and 200 (shown in FIG. 1) is used, but different communication systems also can be used as long as, the data transmission is performed in a peer-to-peer communication manner between the sending-side IP-FAX terminal 100 and the receiving-side IP-FAX terminal 200, and the receiving-side IP-FAX terminal 200 can directly transmits its status information to the sending-side IP-FAX terminal 100 in reply to a request of the sending-side IP-FAX terminal 100 in the communication system. In such a case, the format of receiving-side terminal information in association with the status of the receiving-side IP-Fax terminal 200, and the sequence that the sending-side IP-FAX terminal 100 acquires the receiving-side terminal information, can be different according to communication systems.

B. Second Embodiment

Figure 11:
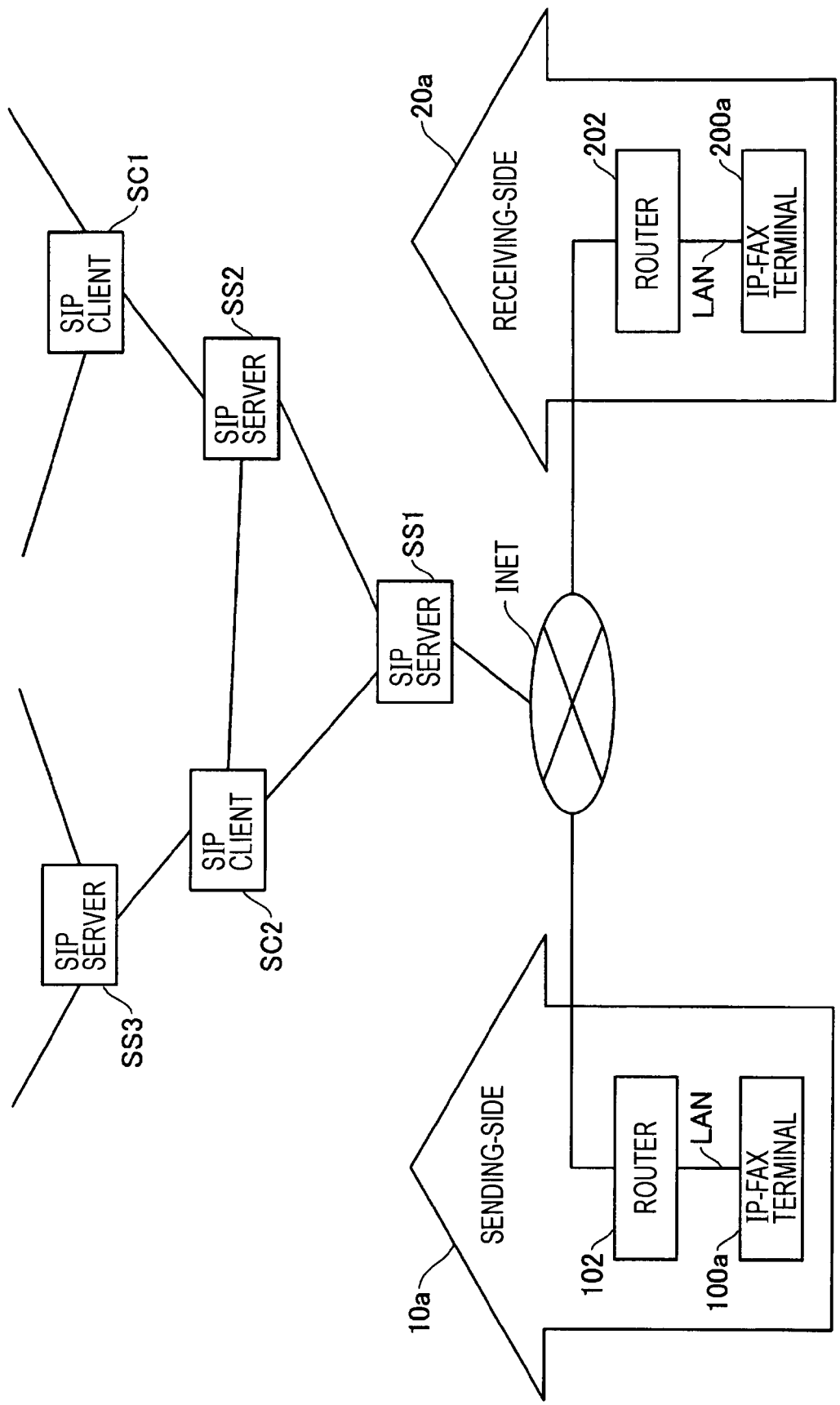
FIG. 11 is an explanatory view illustrating a structure of a facsimile transmission system according to a second embodiment.

FIG. 11 is an explanatory view illustrating a structure of a facsimile transmission system according to a second embodiment. The facsimile transmission system according to the second embodiment is different from the facsimile transmission system according to the first embodiment shown in FIG. 1 from the standpoint in that an IP telephone network system (hereinafter, simply referred to as "SIP system") using Session Initiation Protocol (SIP) is used instead of the Skype system as the IP telephone network system. Other points are the same as the facsimile transmission system according to the first embodiment.

In the SIP system shown in FIG. 11, the plurality of super nodes SN1, SN2, and SN3 in the Skype system shown in FIG. 1 is replaced with a plurality of SIP servers SS1, SS2, and SS3. Further, the plurality of general nodes GN1 and GN2 are replaced with a plurality of SIP clients SC1 and SC2. The SIP clients SC1 and SC2 are computers used when a user performs verbal communication via the IP telephone network. Both two IP-FAX terminals 100*a* and 200*a* according to the second embodiment function as the SIP clients of the SIP system.

The SIP servers SS1, SS2, and SS3 store SIP client information (connection information) in a managing range (domain) and user information (presence) of the SIP clients. Thus, the SIP servers SS1, SS2, and SS3 intervene in establishment of peer-to-peer communication between the SIP clients SC1 an SC2 on the basis of the information which is stored. The connection information and the presence is transmitted from the SIP client server to the SIP sever of the domain to which the SIP client belongs.

In the case in which a user performs communication using the SIP system, the user transmits SIP Uniform Resource Identifier (SIP URI) specifying a user of the communication destination. The SIP URI contains a domain name and a user name. The domain name is called fully qualified domain name (FQDN). Over the Internet, an identifier which can specify the domain is used.

A calling-side SIP client (calling-side client) transmits a connection request (INVITE message) containing the SIP URI to the SIP server (calling-side server) to which the corresponding SIP client belongs. The calling-side server specifies the SIP server (calling destination-side server) to which the opponent-side SIP client (calling destination-side client) belongs by referring the domain name contained in the SIP URI after receiving the INVIT message, and transmits the INVITE message to a calling destination-side client via the calling destination-side server. In the case in which the calling destination-side client transmits a predetermined response message (OK response) in reply to the transmitted INVITE message, the OK response is transmitted to the calling destination-side client via the calling destination-side server and the calling-side server. Thus, as the calling-side client establishes the peer-to-peer communication with the calling destination-side client according to the transmitted OK response, communication between the calling-side client and the calling destination-side client starts.

Figure 12:
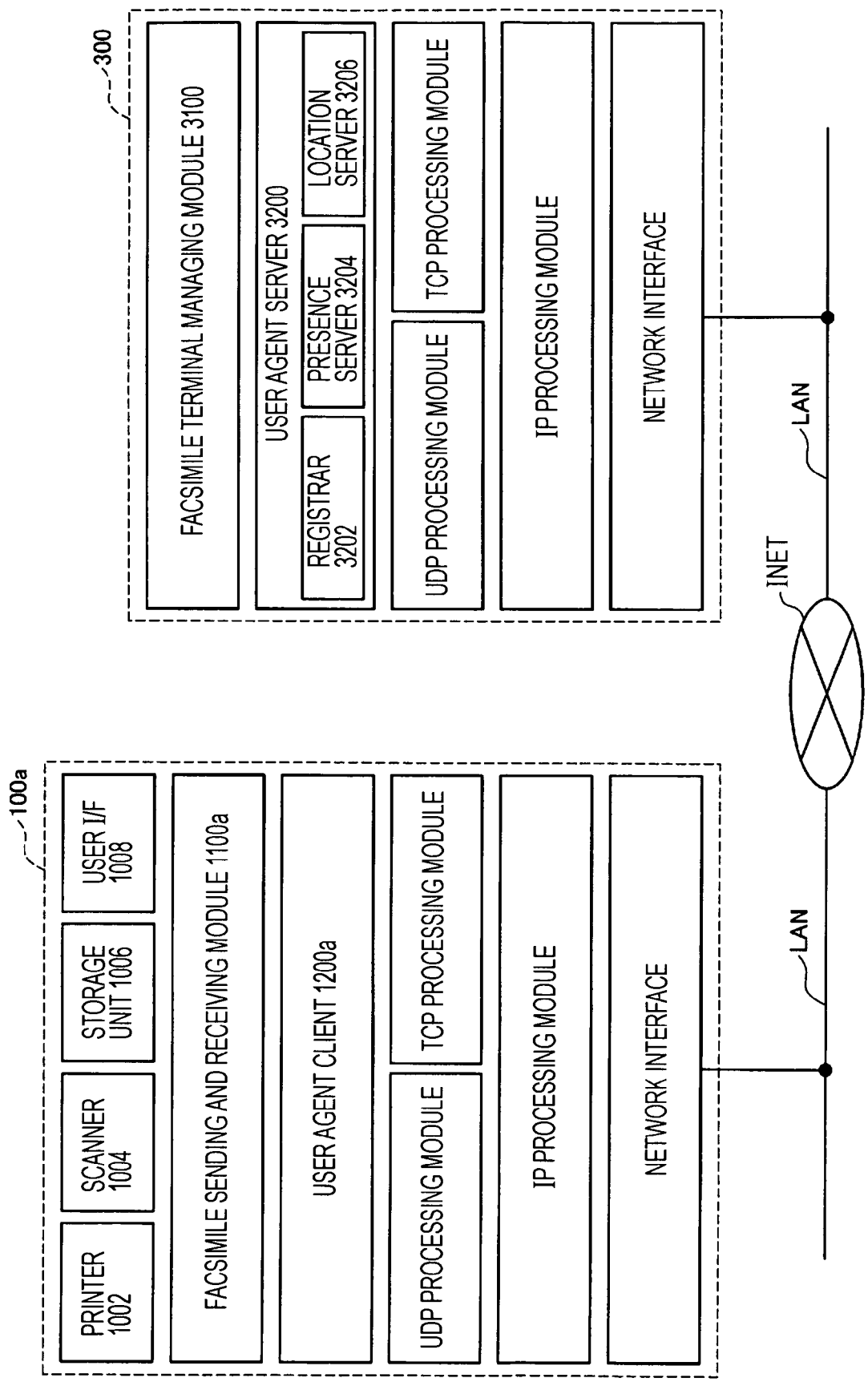
FIG. 12 is a block diagram illustrating a hierarchy of functions in association with facsimile transmission according to the second embodiment.

FIG. 12 is a block diagram illustrating a hierarchy of functions in association with the facsimile transmission according to the second embodiment. In FIG. 12, routers 102 and 202 (shown in FIG. 11) which are disposed between the IP-FAX terminals 100*a* and 200*a* and the Internet INET are omitted. The sending-side (calling-side) IP-FAX terminal 100*a* shown in FIG. 1 and the receiving-side (calling destination-side) IP-FAX terminal 200*a* have almost the same functions. Accordingly, in FIG. 12, the sending-side IP-FAX terminal 100*a* is shown as an IP-FAX terminal representing the sending-side and receiving-side IP FAX terminals 100*a* and 200*a*. Since all of the SIP servers SS1 to SS3 shown in FIG. 11 have the same function, only one SIP server 300 representing the SIP servers SS1 to SS3 is shown in FIG. 12.

The IP-FAX terminal 100*a* according to the second embodiment is different from the IP-FAX terminal 100 according to the first embodiment from the standpoint in that the IP telephone communication module 1200 is replaced with a user agent client 1200*a* and the facsimile sending and receiving module 1100 functioning as a user of the Skype system is replaced with the facsimile sending and receiving module 1100*a* serving as a user of the SIP system.

The user agent client 1200*a* processes data supplied from under-layered modules according to various protocols used in the SIP system, and provides the function provided thereto in the SIP system to the facsimile sending and receiving module 1100*a* which is an upper-layered module. In greater detail, the user agent client 1200*a* produces various messages (SIP messages) used in the SIP according to the instruction supplied from the facsimile sending and receiving module 1100*a*, and then transmits the produced SIP messages to the SIP server 300 which is an under-layered module. The user agent client 1200*a* analyzes the SIP messages which are transmitted from the SIP server 300 and supplied from under-layered modules, and supplies the analysis result to the facsimile sending and receiving module 1100*a*.

The SIP server 300 has a facsimile terminal management module 3100 as a topmost-layered module. A user agent server 3200, a TCP and DP protocol processing module, an IP processing module, and a network interface are disposed in this order from the top layer as under-layered modules of the facsimile terminal management module 3100.

The user agent server 3200 has a registrar 3202, a presence server 3204, and a location server 3206. The registrar 3202, the presence server 3204, and the location server 3206 perform a variety of processing according to the message (request) transmitted from the SIP client.

The facsimile terminal management module 3100 expands the functions of the SIP in order to achieve the facsimile transmission in the SIP system. In greater detail, the facsimile terminal management module 3100 performs data exchange for expanding the functions of the SIP with the user agent server 3200 and thus realizes the expanded functions.

The presence server 3204 receives a subscribe message SUBSCRIBE from the SIP client on the IP telephone network system. The subscribe message is a request for demanding notification of the presence of the specified user. The presence of the specified user is set by a notification message NOTIFY which is transmitted from the SIP client used by the corresponding user. The presence server 3204 notifies the transmission source of the subscribe message the presence of the specified user by transmitting the notification message to the transmission source of the subscribe message.

In the SIP system, either ONLINE which is a user online state or OFFLINE which is a user offline state is notified as the presence. Accordingly, in the second embodiment, of the two presences ONLINE and NA used in the Skype system, the presence OFFLINE which represents a facsimile unreceivable state is used instead of the presence NA.

In the SIP system, an OK message, a pending message, and a rejected message are transmitted to the transmission source of the subscribe message in reply to the subscribe message. Thus, the facsimile terminal management module 3100 transmits these messages to the sending-side IP-FAX terminal. Thus, in the SIP system, the facsimile transmission source, i.e. the sending-side IP-FAX terminal can judge whether the transmission to the facsimile transmission destination, i.e. the receiving-side IP-FAX terminal can be permissible. Kinds of messages and transmission permission statuses in this case are shown in table 4.

TABLE 4

| Kinds of response messages with respect to subscribe messages | Transmission permission statuses of IP-FAX |
|---|---|
| OK message | Transmission is permissible |
| Pending message | Transmission is permitted |
| Rejected message | Transmission is impermissible |

The registrar 3202 analyzes a register message REGISTER transmitted by the user agent client 1200a, and acquires the connection information of the IP-FAX terminal 100a. The acquired connection information is registered in the location server 3206. The location server 3206 transmits the registered connection information in response to a request from the SIP client or the SIP server. In this manner, the SIP client or the SIP server can acquire the connection information of the IP-FAX terminal 100a. If the registration of the connection information is successful, the registrar 3202 transmits the OK response to the user agent client 1200a.

FIG. 13 is an explanatory view illustrating the flow that the register message is transmitted from the IP-FAX terminal 100a to the registrar 3202. FIG. 13(a) shows the transmission sequence of the message between the user agent client 1200a of the IP-FAX terminal 100a and the registrar 3202. FIG. 13(b) shows an example of the register message MGR transmitted from the user agent client 1200a to the registrar 3202. Further, FIG. 13(a) shows the sequence shortly after power is applied to the IP-FAX terminal 100a.

If power is applied to the IP-FAX terminal 100a, in step [R11], the user agent client 1200a transmits the register message MGR shown in FIG. 13(b) to the registrar 3202. The transmitted register message MGR contains a header portion HDR and a body BDY portion having an extensible markup language format (XML format). The registrar 3202 analyzes the head portion HDR of the register message MGR, acquires the connection information of the IP-FAX terminal 100a, and loads the acquired connection information into a database. After the load of the connection information, in step [R12], the registrar 3202 transmits the OK response to the user agent client 1200a.

Generally, the register message in the SIP system does not include the body portion BDY. Accordingly, the registrar 3202 does not analyze the body portion BDY but directly transmits the content of the body portion BDY to the facsimile terminal management module 3100 without analysis. The facsimile terminal management module 3100 sets opponent level information for specifying the opponent level and list of detailed information (permitted information list) which is permissible to be transmitted according to the opponent level according to the content of the body portion BDY transmitted from the registrar 3202. In greater detail, the facsimile terminal management module analyzes opponent level data CLV and permitted information data ALW contained in the body portion BDY, and produces the opponent level information and the permitted information list for each opponent level. Then, the produced the opponent level information and the permitted information list are registered in the location server 3206.

An IP address of the SIP client, which can establish the correspondence relationship with the opponent level, and the SIP URI (User) are registered in the opponent level data CLV. In an example shown in FIG. 13(b), the SIP client having IP address "192.168.12.34" is designated as an opponent having the opponent level "1." Further, two users "user1@east.com" and "user2@west.com" are designated as opponents having the opponent level "2" using the URI. Table 5 shows the opponent level information produced by the facsimile terminal management module 3100 by analyzing the opponent level data CLV shown in FIG. 13(b).

TABLE 5

| IP address of SIP client | Opponent level |
|---|---|
| 192.168.12.34 | 1 |
| 192.168.1.234 (user1@east.com) | 2 |
| 192.168.12.156 (user2@west.com) | 3 |

In table 5, with respect to two users "user1@east.com" and "user2@west.com," the IP addresses of the SIP clients used by the two users are acquired, and the opponent levels are set with respect to the acquired IP addresses. In the SIP system, the IP addresses of the SIP clients can be acquired from the location server 3206 of the SIP server 300 to which the SIP clients belong to.

In the permission information data ALW, the detailed information permitted to be transmitted for each opponent level is listed. In an example shown in FIG. 13(b), the opponent having the opponent level "2" can be given the detailed information such as the print remaining time Remaining_Time, the remaining amount of expendables Remaining_Supply, the remaining capacity of memory Remaining_Memory, an the first transmission destination information Forwarding_1. The opponent having the opponent level "3" can be given the detailed information such as the failure information Failure, the return information Recovery, and the second transmission destination Forwarding_2. The facsimile terminal management module 3100 produces a list of permitted information shown in table 3 by analyzing the permitted information data ALW shown in FIG. 13(*b*).

If a predetermined time (for example, 1800 seconds) passes after the register message MGR is transmitted in step [R21] shown in FIG. 13(*a*), the user agent client 1200*a* transmits the register message to the registrar 3202 in step [R12]. After that, each time the predetermined time passes, the user agent client 1200*a* repeatedly transmits the register message to the registrar 3202. The predetermined time is set to be the half of the time (3600 seconds in FIG. 13(*b*)) designated in an effective period string (expires) of the header portion HDR.

The registrar 3202 updates the connection information on the basis of the register message transmitted in step [R21], and transmits the OK response to the user agent client 120*a*. Further, the register message transmitted since step [R21] is provided with change of status such as addition, delete, and change of the opponent level, and also additionally provided with the opponent level data CLV and the permitted information data ALW in the case in which the detailed information permitted to be transmitted is changed.

In the second embodiment, the IP-FAX terminal 100*a* transmits the opponent level data CLV and the permitted information data ALW to the SIP server 300 when transmitting the register message to the IP-server 300 (step [R21]) after power is supplied, but also may notify the SIP server 300 the data CLV and ALW at different time. For example, the IP-FAX terminal 100*a* may notify the SIP server 300 the data CLV and ALW when the SIP-FAX terminal 100*a* tests communication of the SIP system. Further, the IP-FAX terminal 100*a* may transmit a notification message containing the data CLV and ALW to the SIP sever 300. In this case, the opponent level data CLV and the permitted information data ALW are acquired by the presence server 3204, and transmitted from the presence server 3204 to the sending-side IP-FAX terminal.

Figure 14:
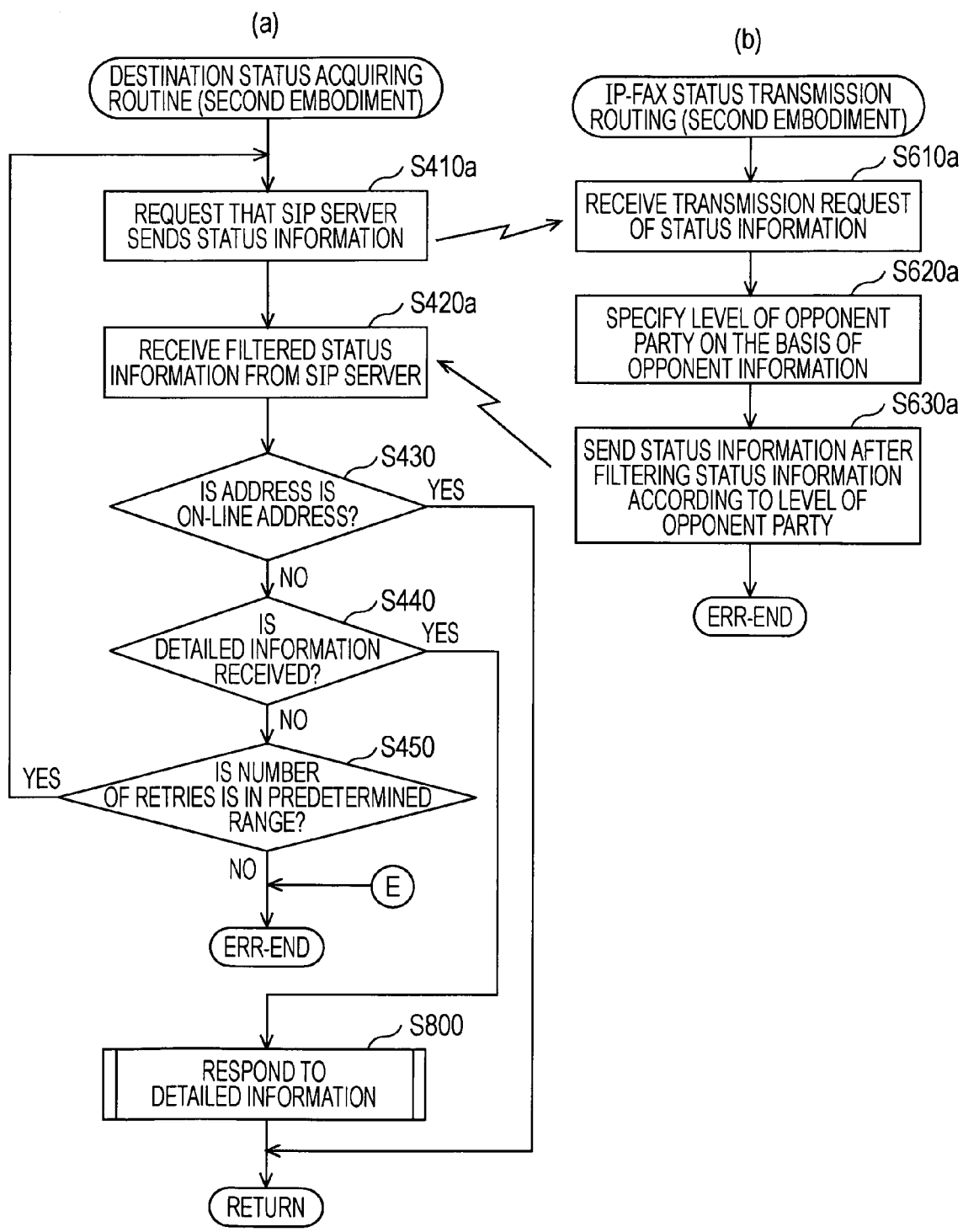
FIG. 14 is an explanatory view illustrating the flow that a sending-side facsimile sending and receiving module 1100a checks status of transmission destination according to the second embodiment.

In the second embodiment, FIG. 14 is an explanatory view illustrating the operation in which the sending-side facsimile sending and receiving module 1100*a* (shown in FIG. 12) checks status of a transmission destination. FIG. 14(*a*) is a flowchart illustrating a transmission destination status acquiring routine executed by the sending-side facsimile sending and receiving module 1100*a*, and FIG. 14(*b*) is a flowchart illustrating an IP-FAX status transmission routine executed by the receiving-side facsimile terminal management module 3100. The transmission destination status acquiring routine and the IP-FAX status transmission routine shown in FIG. 14 according to the second embodiment are different from the flowchart shown in FIG. 8 according to the first embodiment from the standpoint in that five steps S410, S420, and S610 to S630 are replaced with five steps S410*a*, S420*a*, and S610*a* to S630*a*. Other points are the same as the flowchart according to the first embodiment.

In step S410*a* shown in FIG. 14(*a*), the sending-side facsimile sending and receiving module 1100*a* requests transmission of device status of the receiving-side IP-FAX terminal of the receiving-side SIP server (receiving-side server). In greater detail, the facsimile sending and receiving module 1100*a* requests that the location server 3206 of the receiving-side server transmits the status information thereof. The receiving-side facsimile terminal management module 3100 receives the transmission request of the status information transmitted from the facsimile sending and receiving module 1100*a* to the location sever 3206 in step S610*a* shown in FIG. 14(*b*). At this time, identification information (for example, IP address) which is contained in the transmission request and which can specify the sending-side IP-FAX terminal 100 can be acquired.

Next, the receiving-side facsimile terminal management module 3100 determines the opponent level of the sending-side IP-FAX terminal which requested transmission of the status information in step S620*a*. In greater detail, the opponent level is specified on the basis of the opponent information acquired in step S610*a* and the opponent level information (table 5) produced by the registrar 3202.

In step S630*a* shown in FIG. 14(*b*), the receiving-side facsimile terminal management module 3100 filters the detailed information of the receiving-side IP-FAX terminal according to the opponent level specified in step S620*a*. In greater detail, the detailed information to be transmitted is determined on the basis of the opponent level specified in step S620*a* and the permitted information list (table 3) produced by the registrar 3202. Then, the status information selected (filtered) from the status information of the receiving-side IP-FAX terminal, i.e. presence, and the detailed information selected on the basis of the permitted information list are transmitted to the sending-side facsimile sending and receiving module 1100*a* via the location server 3206.

In step S420*a* shown in FIG. 14(*a*), the sending-side facsimile sending and receiving module 1100*a* receives the status information transmitted from the location server 3206 of the receiving-side server in step S630*a* shown in FIG. 14(*b*).

In this manner, in the second embodiment, the facsimile terminal management module 3100 of the receiving-side server can change the status information to be transmitted to the sending-side IP-FAX terminal according to the opponent level of the sending-side IP-FAX terminal. Accordingly, it is possible to prohibit transmission of the information which would not be transmitted to unreliable opponents, but to transmit necessary information to reliable opponents.

In the second embodiment, the facsimile terminal management module 3100 of the SIP server 300 (shown in FIG. 12) serving as a communication establishing unit which intervenes in establishment of a communication path between the sending-side and the receiving-side IP-FAX terminals preliminarily transmits the status information of the receiving-side IP-FAX terminal to the sending-side IP-FAX terminal. Accordingly, the sending-side IP-FAX terminal can grasp the status of the receiving-side IP-FAX prior to the establishment of the peer-to-peer communication with the receiving-side IP-FAX terminal. In such a manner, since the sending-side IP-FAX terminal can grasp the status of the receiving-side IP-FAX prior to the establishment of the communication path, the sensing-side IP-FAX terminal can suspend facsimile transmission according to the status of the receiving-side IP-FAX terminal. Accordingly, it is possible to reduce load imparted to the receiving-side IP-FAX terminal attributable to the establishment of the communication path, and to alleviate network traffic.

In the second embodiment, the register message containing the opponent level data CLV which is the correspondence relationship between the identification information which can specify the sending-side IP-FAX terminal, such as the IP address, and the opponent level which is a class of the sending-side IP-FAX terminal, and the permitted information data AWL representing status information selected according to the opponent level is transmitted from the receiving-side IP-FAX terminal to the SIP server 300 (shown in FIG. 12). Accordingly, the SIP server 300 can select the status information to be transmitted to the sending-side IP-FAX terminal prior to the request (transmission request) demanding notification of the status information, which is made by the sending-side IP-FAX terminal. In this manner, since the status information is selected (filtered) prior to the notification request of the status information, the SIP server 300 can immediately transmit the selected status information to the sending-side IP-FAX terminal.

In the second embodiment, the receiving-side IP-FAX terminal can preliminarily transmit the presence and the detailed information to the SIP server 300 by transmitting the notification message and the register message to the SIP server 300. However, the SIP server 300 may acquire at least either one of the presence and the detailed information from the receiving-side IP-FAX terminal when the SIP server 300 receives the status information transmission request (step S610*a* shown in FIG. 14).

C. Variation

The invention is not limited to the above-described examples and embodiments but can be implemented in a form of various embodiments within the scope of the invention without departing from the spirit of the invention. For example, the invention may be implemented in a form of the following variations.

C1. First variation

In the above-described examples, the status information transmitted to the sending-side IP-FAX terminal is selected according to the opponent level of the sending-side IP-FAX terminal, but such a filtering method of the transmission information is not limitedly performed with respect to the status information but can be performed with respect to various information. For example, content status information representing processing status of image data transmitted by facsimile transmission or other content data is filtered, and can be transmitted to the sending side.

C2. Second variation

Figure 10:
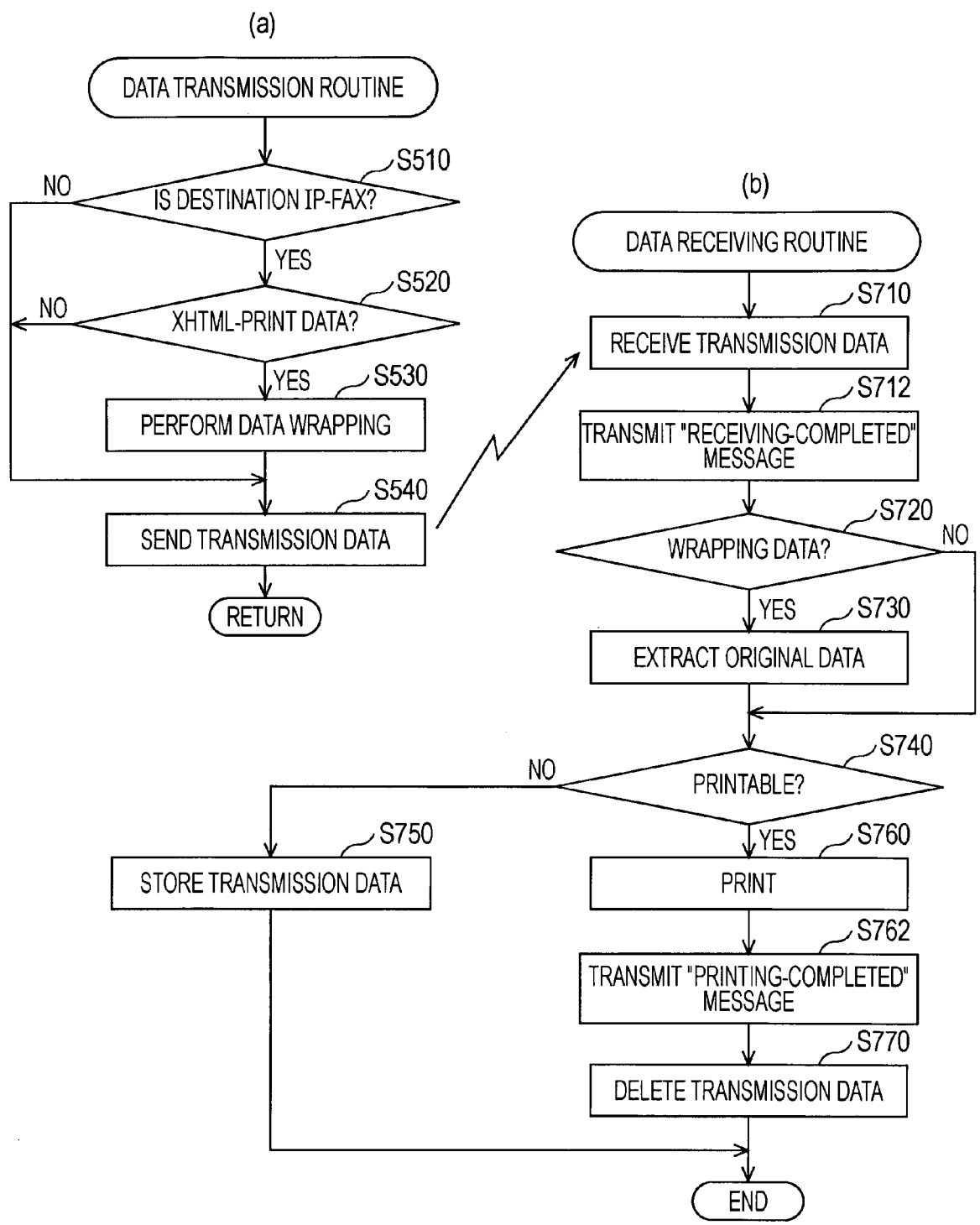
FIG. 10 is a flowchart illustrating an image data transmission routine executed in step S500 shown in FIG. 4.

In each of the examples, the sending-side IP-FAX terminal judges whether the transmission destination is the IP-FAX terminal in step S510 shown in FIG. 10, and then transmits the data to the transmission destination according to the result of the judgment, but the sending-side IP-FAX terminal may generally convert the format of the data to be transmitted according to kinds of the transmission destination (receiving-side terminal). The sending-side IP-FAX terminal selects one data format having the smallest size among data formats that can be processed by the receiving-side terminal, and may transmit the data having the selected data format to the receiving-side terminal. The kinds of the receiving-side terminal can be discriminated on the basis of a software version for performing the functions of the IP-FAX terminal, an operating system (OS) used in the receiving-side terminal, a maker of the receiving-side terminal.

What is claimed is:

1. A facsimile transmission system transmitting an image from a sending device to a receiving device via a network, comprising:
   a status information reply unit which replies to a notification request of status information from the sending device by transmitting the status information to the sending device via the network, the status information representing status of the receiving device to which the sending device desires to transmit the image,
   wherein the status information reply unit includes:
   a transmission source classifying portion which, after the notification request from the sending device, determines a class of the sending device by classifying the sending device into one of a plurality of classes on the basis of a message transmitted by the sending device via the network upon the notification request; and
   a selected-status information transmitting portion which transmits the status information to the sending device via the network, the status information being selected according to the determined class of the sending device.

2. The facsimile transmission system according to claim 1, further comprising a communication establishing portion intervening in establishment of communication path between the sending device and the receiving device, and the status information reply unit is provided in the communication establishing portion.

3. The facsimile transmission system according to claim 2, wherein the communication establishing portion preliminarily acquires from the receiving device transmission source classification information representing the correspondence relationship between identification information which is contained in the message and which can specify the sending device and the class of the sending device, and selected-information specification information which specifies the status information selected according to the class of the sending device.

4. The facsimile transmission system according to claim 1, wherein the receiving device is pre-designated to receive the image from the sending device prior to the notification request.

5. The facsimile transmission system according to claim 1, wherein the receiving device includes the status information reply unit.

6. A facsimile receiving device receiving an image from a sending device connected thereto via a peer-to-peer communication path, comprising:
   a status information reply unit which replies to a notification request of status information from the sending device by transmitting the status information to the sending device via the peer-to-peer communication path, the status information representing status of the receiving device to which the sending device desires to transmit the image,
   wherein the status information reply unit includes:
   a transmission source classifying portion which, after the notification request from the sending device, determines a class of the sending device by classifying the sending device into one of a plurality of classes on the basis of a message transmitted by the sending device to the receiving device via the peer-to-peer communication path upon the notification request; and
   a class-based status information transmission portion which transmits class-based status information to the sending device via the peer-to-peer communication path, the class-based status information being a kind of status information preliminarily set with respect to the determined class of the sending device.

7. The facsimile receiving device according to claim 6, wherein communication between the sending device and the receiving device via the peer-to-peer communication path is performed based on a predetermined protocol, and wherein each of a plurality of class-based status information preliminarily set with respect to the plurality of classes includes status information representing the status of the receiving device prescribed by the predetermined protocol.

8. The facsimile receiving device according to claim 7, wherein the status information reply portion transmits the status information to the sending device before classifying the sending device by the transmission source classifying portion.

9. The facsimile receiving device according to claim 8, wherein the status information reply portion transmits additional status information to the sending device after transmission of the status information in the case in which the class-based status information transmitted to the sending device contains the additional status information in addition to the status information.

10. The facsimile receiving device according to claim 6, wherein the receiving device is pre-designated to receive the image from the sending device prior to the notification request.

11. A facsimile receiving method executed in a facsimile receiving device which receives an image from a sending device connected thereto via a peer-to-peer communication path, the facsimile receiving method comprising:
(a) transmitting the status information to the sending device via the peer-to-peer communication path in reply to a notification request of status information from the sending device, the status information representing status of the receiving device to the sending device to which the sending device desires to transmit the image, wherein the step (a) includes:
(1) after the notification request from the sending device, determining a class of the sending device by classifying the sending device into one of a plurality of classes on the basis of a message transmitted by the sending device to the receiving device via the peer-to-peer communication path upon the notification request, and
(2) transmitting class-based status information which is status information a kind of which is preliminarily determined with respect to the class of the sending device, which is classified in the step (1).

12. The facsimile transmission method according to claim 11, further comprising, prior to step (a), receiving from a user a designation of one of a plurality of receiving devices as the receiving device to receive the image.

* * * * *